United States Patent
Li et al.

(10) Patent No.: US 11,012,724 B2
(45) Date of Patent: May 18, 2021

(54) VIDEO TRANSMISSION METHOD, APPARATUS, AND SYSTEM, AND COMPUTER READABLE STORAGE MEDIUM

(71) Applicant: Huawei Technologies Co., Ltd., Shenzhen (CN)

(72) Inventors: Zhenyu Li, Beijing (CN); Jinhui Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/888,005

(22) Filed: May 29, 2020

(65) Prior Publication Data

US 2020/0296438 A1    Sep. 17, 2020

Related U.S. Application Data

(63) Continuation of application No. PCT/CN2018/117678, filed on Nov. 27, 2018.

(30) Foreign Application Priority Data

Nov. 30, 2017    (CN) .......................... 201711244047.2

(51) Int. Cl.
*H04N 21/2365*    (2011.01)
*H04N 19/176*    (2014.01)
(Continued)

(52) U.S. Cl.
CPC ..... *H04N 21/23655* (2013.01); *H04N 19/176* (2014.11); *H04N 21/2187* (2013.01); *H04N 21/2402* (2013.01)

(58) Field of Classification Search
None
See application file for complete search history.

(56) References Cited

U.S. PATENT DOCUMENTS

| | | | |
|---|---|---|---|
| 2004/0109613 | A1 | 6/2004 | Guleryuz |
| 2012/0057630 | A1 | 3/2012 | Saxena et al. |
| 2013/0047191 | A1* | 2/2013 | Gonz Lez-Castano ..................... H04N 21/8456 725/103 |

FOREIGN PATENT DOCUMENTS

| | | |
|---|---|---|
| CN | 102045554 A | 5/2011 |
| CN | 102378001 A | 3/2012 |

(Continued)

OTHER PUBLICATIONS

Dukkipati, N., "An Argument for Increasing TCP's Initial Congestion Window," No. 3, Jul. 2010, 8 pages.

(Continued)

*Primary Examiner* — Stuart D Bennett
(74) *Attorney, Agent, or Firm* — Conley Rose, P.C.

(57) ABSTRACT

A video transmission method includes obtaining a target video data segment, obtaining t reference data sets, encoding the target video data segment using each reference data set to obtain t encoded data blocks that are in a one-to-one correspondence with the t reference data sets, where any k encoded data blocks in the t encoded data blocks and k reference data sets that are in the t reference data sets and that are in a one-to-one correspondence with the any k encoded data blocks can construct an equation set matrix, and data of a solution matrix of the equation set matrix is data of the target video data segment, and sending t first reference data groups to a video decoding device using n front-end servers, where each first reference data group includes one encoded data block and a corresponding reference data set.

20 Claims, 10 Drawing Sheets

(51) Int. Cl.
H04N 21/2187 (2011.01)
H04N 21/24 (2011.01)

(56) References Cited

FOREIGN PATENT DOCUMENTS

| CN | 103098473   | 5/2013  |
|----|-------------|---------|
| CN | 105812840 A | 7/2016  |
| CN | 105847854 A | 8/2016  |
| CN | 106162209 A | 11/2016 |

OTHER PUBLICATIONS

Cardwell, N., et al., "BBR Congestion-Based Congestion Control," Sep.-Oct. 2016, 34 pages.
Zhou, J., et al., "Demystifying and Mitigating TCP Stalls at the Server Side," Dec. 1-4, 2015, 13 pages.
Ford, A., et al., "TCP Extensions for Multipath Operation with Multiple Addresses," draft-ietf-mptcp-multiaddressed-09 Jun. 6, 2012, 62 pages.
Fitzek, F., "Implementation and performance evaluation of network coding for cooperative mobile devices," Jun. 2008, 7 pages.
"QUIC FEC v1," https://www.chromium.org/quic Author: ianswett@google.com Last Updated: Feb. 19, 2016,total 5 pages.
"QUIC, A Multiplexed Stream Transport Over UDP—The Chromium Projects," https://docs.google.com/document/d/Hg1SaLEI6T4rEU9j-isovCo8VEjjnuCPTcLNJewj7Nk/edit, 2 pages.

* cited by examiner

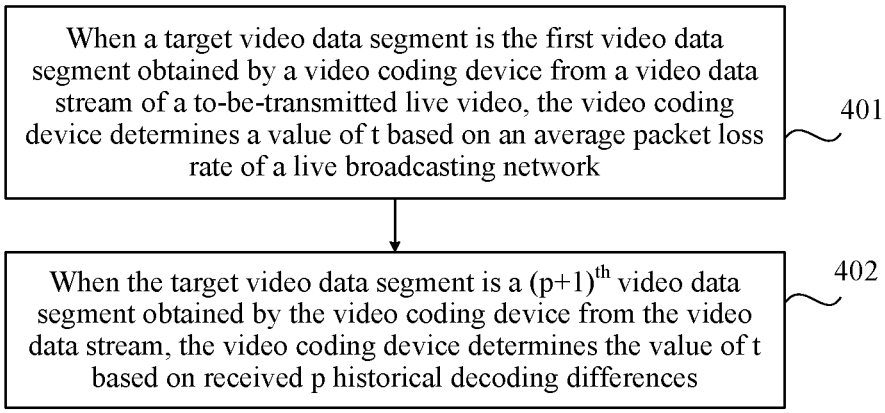
FIG. 4
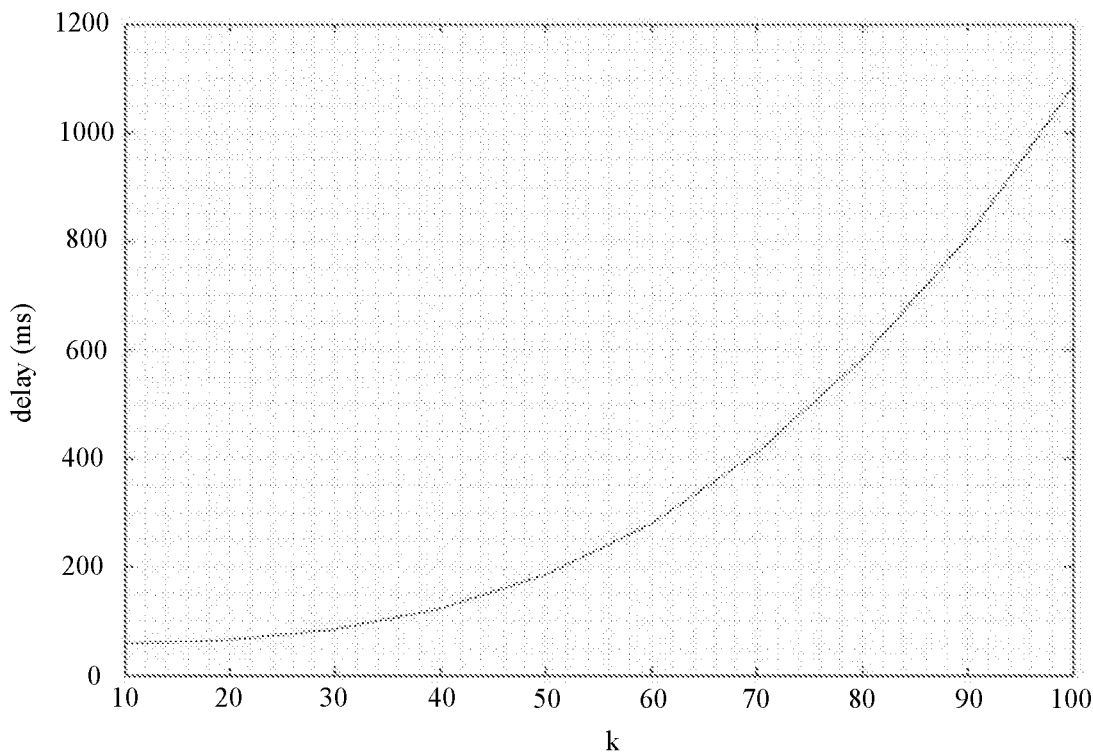
FIG. 5A
FIG. 5B

VIDEO TRANSMISSION METHOD, APPARATUS, AND SYSTEM, AND COMPUTER READABLE STORAGE MEDIUM

CROSS-REFERENCE TO RELATED APPLICATIONS

This is a continuation of International Patent Application No. PCT/CN2018/117678 filed on Nov. 27, 2018, which claims priority to Chinese Patent Application No. 201711244047.2 filed on Nov. 30, 2017. The disclosures of the aforementioned applications are hereby incorporated by reference in their entireties.

TECHNICAL FIELD

This application relates to the video transmission field, and in particular, to a video transmission method, apparatus, and system, and a computer readable storage medium.

BACKGROUND

Currently, network live broadcasting is becoming increasingly common in people's daily lives. The network live broadcasting means live video broadcasting performed using a live broadcasting network. In a network live broadcasting process, an anchor terminal may shoot a live video, and send the live video to a corresponding server, and then the server sends the live video to an audience terminal such that a user to whom the audience terminal belongs watches the live video. During network live broadcasting, both uplink and downlink of the live video are real time, and a live broadcasting network cannot cache the live video in advance. In addition, the user has a relatively high requirement for a delay degree and a freezing degree of the live video. Therefore, how to ensure an uplink rate and a downlink rate of the live video so as to ensure a low delay and low freezing of the live video becomes an important part of network live broadcasting.

In a related technology, the live broadcasting network may include a content delivery network (CDN). In an uplink process of the live video, the anchor terminal may send the live video to a front-end server in the CDN network, and the front-end server may forward the live video to a background storage server in the CDN network. In a downlink live broadcasting process, the audience terminal may request the live video from another front-end server in the CDN network, and the front-end server that receives the request may obtain the live video from the background storage server, and send the live video to the audience terminal. The CDN network can avoid, as much as possible, bottlenecks and processes on the Internet that may affect a data transmission speed and stability such that data is transmitted faster and more stably. Therefore, the related technology can ensure the uplink rate and the downlink rate of the live video to some extent.

In the uplink process of the live video, if a packet loss occurs, the anchor terminal needs to retransmit video data, and this easily causes freezing and a delay of the live video.

SUMMARY

This application provides a video transmission method, apparatus, and system, and a computer readable storage medium. Technical solutions provided in this application can reduce a probability that freezing and a delay occur in a live video. The technical solutions provided in this application are as follows.

According to a first aspect, a video transmission method is provided, and is used in a video coding device in a live broadcasting network, where the live broadcasting network includes the video coding device, a video decoding device, and a plurality of front-end servers, and the method includes obtaining a target video data segment, where the target video data segment is a segment of data in a video data stream of a to-be-transmitted live video, the target video data segment includes k data blocks, and k is a positive integer greater than or equal to 1, obtaining t reference data sets, where each reference data set includes at least one piece of reference data, and t is a positive integer greater than k, encoding the target video data segment using each reference data set, to obtain t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment, and sending t first reference data groups to the video decoding device using n front-end servers, where n is a positive integer greater than or equal to 1, where each first reference data group includes one encoded data block and a corresponding reference data set.

In this application, the video coding device may encode, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of a live video to some extent. In addition, when n is greater than 1, the video coding device may send video data in an uplink process of the live video using a plurality of paths, that is, using a plurality of front-end servers. This improves utilization of uplink bandwidth of the live broadcasting network, and can avoid the freezing and the delay of the live video to some extent.

In an embodiment of this application, each reference data set includes k pieces of reference data that are in a one-to-one correspondence with the k data blocks, and encoding the target video data segment using each reference data set, to obtain t encoded data blocks that are in a one-to-one correspondence with the t reference data sets includes for each reference data set, multiplying each piece of reference data included in the reference data set by a corresponding data block to obtain k products, and adding the k products to obtain an encoded data block corresponding to the reference data set.

In an embodiment of this application, obtaining a target video data segment includes obtaining the video data stream of the to-be-transmitted live video, obtaining a data block from the video data stream, and in first preset duration, when a quantity of obtained data blocks is not less than k, forming the target video data segment using the obtained k data blocks, or when the quantity of obtained data blocks is less than k at the end of the first preset duration, padding the obtained data blocks using preset data, to obtain k data blocks, and forming the target video data segment using the k data blocks obtained through padding.

In some cases, due to a network communication quality problem, the video coding device may obtain the video data stream at a relatively small speed. In this case, the video coding device may be incapable of obtaining the k data blocks from the video data stream quickly, causing a relatively slow encoding speed of the video coding device. To ensure the encoding speed of the video coding device, in this application, when the video coding device fails to obtain the k data blocks in first preset duration, the video coding device may pad obtained data blocks using preset data, to obtain the k data blocks, and then encode the k data blocks obtained through padding, to improve the encoding speed.

In an embodiment of this application, the target video data segment is a $(p+1)^{th}$ video data segment obtained by the video coding device from the video data stream, p is a positive integer greater than or equal to 1, and before obtaining t reference data sets, the method further includes receiving p historical decoding differences sent by the video decoding device, where the p historical decoding differences are in a one-to-one correspondence with p video data segments preceding the target video data segment in the video data stream, and each historical decoding difference is used to reflect a quantity of reference data groups that the video decoding device lacks at the end of second preset duration before successfully obtaining corresponding video data segments through decoding, and determining, based on the p historical decoding differences, a value of the quantity t of reference data sets that need to be obtained.

Optionally, the $i^{th}$ historical decoding difference $d_i$ in the p historical decoding differences meets, when the video decoding device successfully obtains, in the second preset duration through decoding, an $i^{th}$ video data segment that is in the video data stream and that corresponds to the $i^{th}$ historical decoding difference, $d_i=0$, and when the video decoding device fails to obtain the $i^{th}$ video data segment through decoding at the end of the second preset duration, $d_i=y-x$, where y is a quantity of reference data groups required by the video decoding device to successfully obtain the $i^{th}$ video data segment through decoding, x is a quantity of reference data groups corresponding to the $i^{th}$ video data segment that are obtained by the video decoding device at the end of the second preset duration, and $1 \leq i \leq p$.

Optionally, determining, based on the p historical decoding differences, a value of the quantity t of reference data sets that need to be obtained includes calculating, based on the p historical decoding differences and a first formula, the value of the quantity t of reference data sets that need to be obtained, where the first formula is:

$$t = \begin{cases} \min\{(1+\alpha_p)t_p, (t_p+1)\} & F_p > 0 \\ \max\{(t_p-1), k\}, & F_p = 0, F_{p-1} = 0, F_{p-2} = 0, \text{ and } p > 2 \\ t_p & F_p = 0, F_{p-1} = 0, \text{ and } p > 1 \\ t_p & F_p = 0 \text{ and } p \geq 1 \end{cases}$$

where $F_i = d_i/k$ and $$\alpha_i = \begin{cases} (1-g) \times \alpha_{i-1} + g \times F_i & 1 < i \leq p \\ 0 & i = 1 \end{cases},$$

where g is weight parameter, $d_i$ is the $i^{th}$ historical decoding difference in the p historical decoding differences, $t_p$ is a quantity of reference data sets obtained by the video coding device before encoding a $p^{th}$ video data segment in the video data stream.

In an embodiment of this application, the target video data segment is the first video data segment obtained by the video coding device from the video data stream, and before the obtaining t reference data sets, the method further includes determining, based on an average packet loss rate of the live broadcasting network, a value of the quantity t of reference data sets that need to be obtained.

Optionally, determining, based on an average packet loss rate of the live broadcasting network, a value of the quantity t of reference data sets that need to be obtained includes calculating, based on the average packet loss rate of the live broadcasting network and a second formula, the value of the quantity t of reference data sets that need to be obtained, where the second formula is:

$$t=\min\{(k+1), \lfloor (1+\rho) \times k \rfloor\},$$

where ρ is the average packet loss rate of the live broadcasting network, and $\lfloor \ \rfloor$ is a rounding down operator.

Before obtaining the t reference data sets, the video coding device determines the value of t based on the first formula or the second formula such that it can be ensured that the video coding device sets a proper value for t, thereby avoiding a waste of network resources of the live broadcasting network and avoiding a case in which the video decoding device cannot successfully obtain the target video data segment through decoding.

In an embodiment of this application, after sending t first reference data groups to the video decoding device using n front-end servers, the method further includes receiving a current decoding difference sent by the video decoding device, where the current decoding difference corresponds to the target video data segment, and the current decoding difference is used to reflect a quantity of first reference data groups that the video decoding device lacks at the end of second preset duration before successfully obtaining the target video data segment through decoding, when the current decoding difference is greater than a preset difference threshold, obtaining m reference data sets, and encoding the target video data segment using each of the m reference data sets, to obtain m encoded data blocks that are in a one-to-one correspondence with the m reference data sets, where m is a positive integer greater than or equal to k, and sending m first reference data groups to the video decoding device using q front-end servers, where q is a positive integer greater than or equal to 1.

When the video decoding device fails to obtain the target video data segment through decoding, the video coding device may further retransmit the first reference data group, to ensure that the video decoding device can successfully obtain the target video data segment through decoding.

In an embodiment of this application, before sending t first reference data groups to the video decoding device using n front-end servers, the method further includes determining r front-end servers that have established communication connections to the video coding device, where r is a positive integer greater than or equal to n, and determining the n front-end servers from the r front-end servers based on a data transmission rate between the video coding device and each of the r front-end servers, where communication quality between the n front-end servers and the video coding device is better than communication quality between another front-end server and the video coding device.

Optionally, determining the n front-end servers from the r front-end servers based on a data transmission rate between the video coding device and each of the r front-end servers includes calculating a utility value of each front-end server based on a third formula and the data transmission rate between the video coding device and each of the r front-end servers, where the third formula is:

$$u_j = \frac{thr_j}{1 + e^{\beta \times (\rho_j - \rho)}},$$

where $u_j$ is a utility value of a $j^{th}$ front-end server in the r front-end servers, $1 \leq j \leq r$, $thr_j$ is a data transmission rate between the video coding device and the $j^{th}$ front-end server, $\rho_j$ is a packet loss rate between the video coding device and the $j^{th}$ front-end server, $\rho$ is an average packet loss rate of the live broadcasting network, and $\beta$ is a constant, and determining the n front-end servers from the r front-end servers in descending order of utility values.

Optionally, sending t first reference data groups to the video decoding device using n front-end servers includes determining, based on a utility value of each front-end server, a quantity of first reference data groups corresponding to the front-end server, where the quantity of first reference data groups corresponding to the front-end server is positively correlated with the utility value of the front-end server, and a sum of quantities of first reference data groups corresponding to the n front-end servers is t, and sending a corresponding quantity of first reference data groups to each front-end server.

Optionally, sending t first reference data groups to the video decoding device using n front-end servers includes determining, based on a fourth formula, a quantity of first reference data groups corresponding to each of the n front-end servers, where the fourth formula is $$y_l = \frac{t \times u_l}{\sum_{w=1}^{n} u_w},$$

where $y_l$ is a quantity of first reference data groups corresponding to the first front-end server in the n front-end servers, $u_l$ is a utility value of the first front-end server, $\sum_{w=1}^{n} u_w$ is a sum of utility values of the n front-end servers, and $1 \leq l \leq n$, and sending a corresponding quantity of first reference data groups to each front-end server such that the front-end server sends the received first reference data groups to the video decoding device.

The video coding device may determine the n front-end servers with better network communication quality from the r front-end servers that have established communication connections to the video coding device, and send the t first reference data groups to the video decoding device using the n front-end servers. Because the network communication quality between the video coding device and the determined n front-end servers is relatively good, the video coding device sends data at a relatively fast rate using the n front-end servers such that an uplink rate of the video data stream can be ensured.

In addition, network communication quality between a front-end server with a relatively large utility value and the video coding device is relatively good, and the video coding device may send a relatively large quantity of first reference data groups to the front-end server. Network communication quality between a front-end server with a relatively small utility value and the video coding device is relatively poor, and to reduce a data transmission delay, the video coding device may send a relatively small quantity of first reference data groups to the front-end server.

In an embodiment of this application, before obtaining a target video data segment, the method further includes determining the quantity k of data blocks in the target video segment based on a preset correspondence between a transmission delay and a quantity of data blocks such that a transmission delay corresponding to the quantity k of data blocks falls within a preset transmission delay range, where the transmission delay is a transmission delay existing when the anchor terminal sends the video data segment to the video decoding device.

Optionally, the correspondence is:

$$\text{delay} = \frac{k \times B}{\text{bit\_rate}} + 2 \times T_0 \times \left(\frac{k}{k_0}\right)^2 \times \frac{B}{B_0} +$$

$$t \times B \times \frac{1}{(1 + e^{\beta \times (\rho_{min} - \rho)}) \times \sum_{w=1}^{n} \frac{thr_w}{1 + e^{\beta \times (\rho_w - \rho)}}} +$$

$$\max\left[\frac{1}{2} \times RTT_v \times (1 - \text{loss }\%_v) + RTO \times \text{loss }\%_v\right] + \Delta,$$

where delay is the transmission delay, B is a data volume size of the data block, bit_rate is a video play bit rate of the to-be-transmitted live video, $T_0$ is duration required to encode or decode a video data segment including $k_o$ data blocks whose data volume sizes are $B_o$, $\beta$ is a constant, $\rho_{min}$ is a minimum value of a packet loss rate between the video coding device and each of the n front-end servers, $\rho$ is an average packet loss rate of the live broadcasting network, $thr_w$ is a data transmission rate between the video coding device and a $w^{th}$ front-end server in the n front-end servers, $\rho_w$ is a packet loss rate between the video coding device and the $w^{th}$ front-end server in the n front-end servers, $RTT_v$ is round-trip duration of a data packet between a $v^{th}$ front-end server in the n front-end servers and the video decoding device, loss $\%_v$ is a packet loss rate between the $v^{th}$ front-end server in the n front-end servers and the video decoding device, RTO is a retransmission timeout, max is a maximization operation, $\Delta$ is an error delay, and $1 \leq v \leq n$.

A proper value is set for k such that an uplink delay of the video data segment can be within the preset transmission delay range, thereby ensuring an uplink rate of the video data segment, and avoiding a phenomenon that freezing occurs very frequently or a delay is very long when an audience terminal plays the to-be-transmitted live video.

In an embodiment of this application, sending t first reference data groups to the video decoding device using n front-end servers includes generating a reference data packets, where each reference data packet includes at least one first reference data group, a format of the reference data packet is a User Datagram Protocol (UDP)-based Data Transmission Protocol (UDT) format, and a is a positive integer greater than or equal to 1, and sending the a reference data packets to the video decoding device using the n front-end servers.

In the other approaches, a data transmission protocol used in a live broadcasting network is usually a Transmission Control Protocol (TCP), and a congestion control mechanism of the TCP protocol is additive increase multiplicative decrease (AIMD) mechanism. In the AIMD mechanism, when a packet loss occurs on a link, transmit windows of the link are halved. For example, when a packet loss occurs between a sending device A and a receiving device B, the AIMD mechanism halves transmit windows of the sending device A. When transmit windows are halved, a data transmission rate is relatively seriously affected. Therefore, when a video data stream is transmitted in the live broadcasting network based on the TCP protocol, a packet loss relatively seriously affects a transmission rate of the video data stream, causing a phenomenon that a delay is very long and freezing occurs very frequently when an audience terminal plays the live video.

To reduce impact exerted by the packet loss on the transmission rate of the video data stream in the live broadcasting network, in this embodiment of this application, the live broadcasting network may transmit the video data stream based on a UDT protocol. To be specific, the video coding device sends the a reference data packets to the video decoding device based on the UDT protocol. A congestion control mechanism of the UDT protocol is decreasing AIMD (DAIMD) mechanism. In the DAIMD mechanism, when a packet loss occurs on a link, a transmit window may be reduced based on available bandwidth of the link, and a reduction amplitude of the transmit window is a random number between ⅛ and ½. Therefore, impact exerted by the packet loss on the transmission rate of the video data stream in the live broadcasting network can be reduced in comparison with that in the TCP protocol.

In an embodiment of this application, each reference data packet further includes an identifier of the target video data segment and/or an identifier of a live broadcasting channel to which the to-be-transmitted live video belongs.

According to a second aspect, a video transmission method is provided, and is used in a video decoding device in a live broadcasting network, where the live broadcasting network includes a video coding device, the video decoding device, and a plurality of front-end servers, and the method includes receiving first reference data groups sent by u front-end servers, where each first reference data group includes an encoded data block and a corresponding reference data set, each encoded data block is obtained by the video coding device by encoding a target video data segment using a corresponding reference data set, the target video data segment is a segment of data in a video data stream of a live video, the target video data segment includes k data blocks, the reference data set includes at least one piece of reference data, k is a positive integer greater than or equal to 1, and u is a positive integer greater than or equal to 1, in second preset duration, when a quantity of received first reference data groups reaches k, constructing an equation set matrix based on encoded data blocks and reference data sets in the received k first reference data groups, and determining data of a calculated solution matrix of the equation set matrix as data of the target video data segment.

In an embodiment of this application, receiving first reference data groups sent by u front-end servers includes receiving at least one reference data packet sent by the u front-end servers, where each reference data packet includes at least one first reference data group, and a format of the reference data packet is a UDT format.

In an embodiment of this application, the method further includes when a quantity of first reference data groups stored in the preset storage location is less than k at the end of the second preset duration, deleting the first reference data groups stored in the preset storage location.

In an embodiment of this application, the method further includes when the quantity of received first reference data groups is less than k at the end of the second preset duration, obtaining an absolute value of a difference between the quantity of received first reference data groups and k, and sending the absolute value to the video coding device as a current decoding difference.

If the video decoding device deletes the first reference data group, a case in which reference data groups obtained by encoding other video data segments overflow from the preset storage location because the first reference data group occupies the preset storage location for excessively long time can be avoided. If the video decoding device does not delete the first reference data group and sends the current decoding difference to the video coding device, a quantity of first reference data groups subsequently retransmitted by the video coding device to the video decoding device can be reduced, thereby saving network resources.

In an embodiment of this application, the method further includes in the second preset duration, after the quantity of received first reference data groups reaches k, sending a current decoding difference to the video coding device, where the current decoding difference is 0.

In an embodiment of this application, constructing an equation set matrix based on encoded data blocks and reference data sets in the received k first reference data groups includes parsing the received k first reference data groups to obtain k encoded data blocks and k reference data sets that are in a one-to-one correspondence with the k encoded data blocks, constructing a constant-term matrix of the equation set matrix using the k encoded data blocks, where each encoded data block is used as one row of the constant-term matrix, and constructing a coefficient matrix of the equation set matrix using the k reference data sets, where each reference data set is used as one row of the coefficient matrix, and a rank of the row in which each reference data set is located in the coefficient matrix is the same as a rank of a row in which a corresponding encoded data block is located in the constant-term matrix.

In an embodiment of this application, after receiving first reference data groups sent by u front-end servers, the method further includes storing the at least two first reference data groups in preset storage locations.

In an embodiment of this application, a storage space size of the preset storage location is determined based on maximum delay duration, minimum delay duration, and generation duration of a video data segment in the video data stream, where the maximum delay duration is maximum duration required by the video coding device to send the reference data group to the video decoding device through the front-end server, and the minimum delay duration is minimum duration required by the video coding device to send the reference data group to the video decoding device through the front-end server.

Optionally, the storage space size of the preset storage location meets a sixth formula, and the sixth formula is:

$$Q = \frac{\max(\text{delay}) - \min(\text{delay})}{\text{generate\_time}} \times s,$$

where Q is the storage space size of the preset storage location, max(delay) is the maximum delay duration, min(delay) is the minimum delay duration, generate_time is the generation duration of the video data segment in the video data stream, and s is a data volume size of the video data segment.

The preset storage location may need to simultaneously store reference data groups obtained by encoding a plurality of video data segments. To avoid overflow of the reference data groups from the preset storage location due to excessively small storage space of the preset storage location, a proper storage space size may be set for preset storage space in this embodiment of this application.

According to a third aspect, a video transmission apparatus is provided, where the apparatus includes at least one module, and the at least one module is configured to implement the video transmission method provided in the first aspect or any optional manner of the first aspect.

According to a fourth aspect, a video transmission apparatus is provided, where the apparatus includes at least one module, and the at least one module is configured to implement the video transmission method provided in the second aspect or any optional manner of the second aspect.

According to a fifth aspect, a video transmission apparatus is provided, where the apparatus includes a processor and a memory, where the processor is configured to execute an instruction stored in the memory, and the processor executes the instruction to implement the video transmission method provided in the first aspect or any optional manner of the first aspect.

According to a sixth aspect, a video transmission apparatus is provided, where the apparatus includes a processor and a memory, where the processor is configured to execute an instruction stored in the memory, and the processor executes the instruction to implement the video transmission method provided in the second aspect or any optional manner of the second aspect.

According to a seventh aspect, a computer readable storage medium is provided, where the computer readable storage medium stores an instruction, and when the instruction runs on a processing component of a computer, the processing component is enabled to perform the video transmission method provided in the first aspect or any optional manner of the first aspect, or the processing component is enabled to perform the video transmission method provided in the second aspect or any optional manner of the second aspect.

Beneficial effects brought by the technical solutions provided in the embodiments of the present disclosure are as follows.

The video coding device encodes, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of a live video to some extent. In addition, when n is greater than 1, the video coding device may send video data in an uplink process of the live video using a plurality of paths, that is, using a plurality of front-end servers. This improves utilization of uplink bandwidth of the live broadcasting network, and can avoid the freezing and the delay of the live video to some extent.

Figure 6:
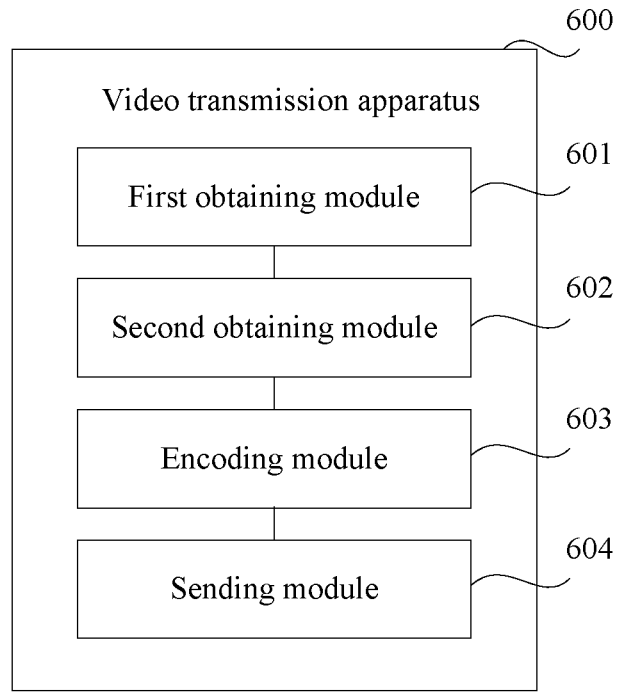
Figure 7:
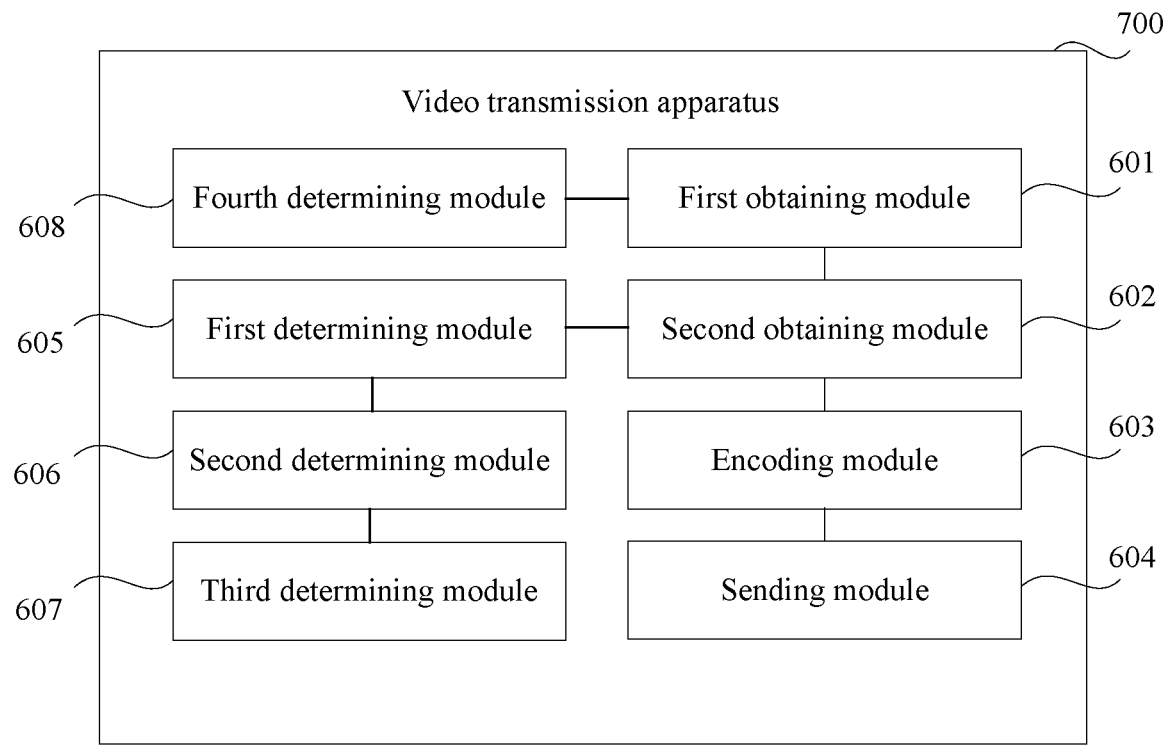
Figure 8:
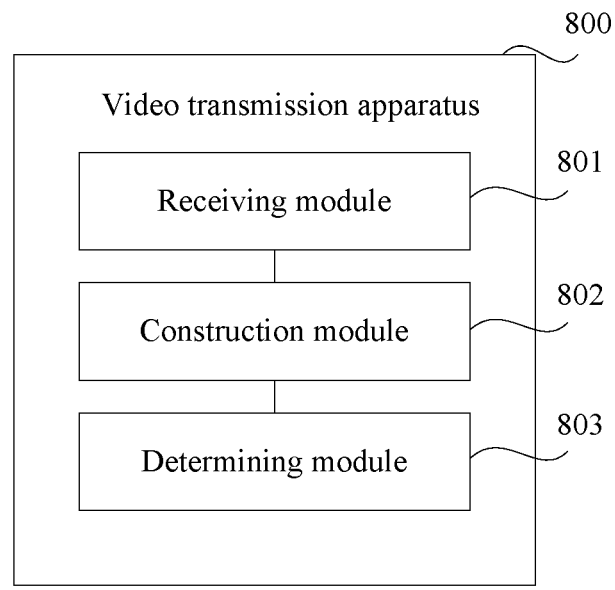
Figure 9:
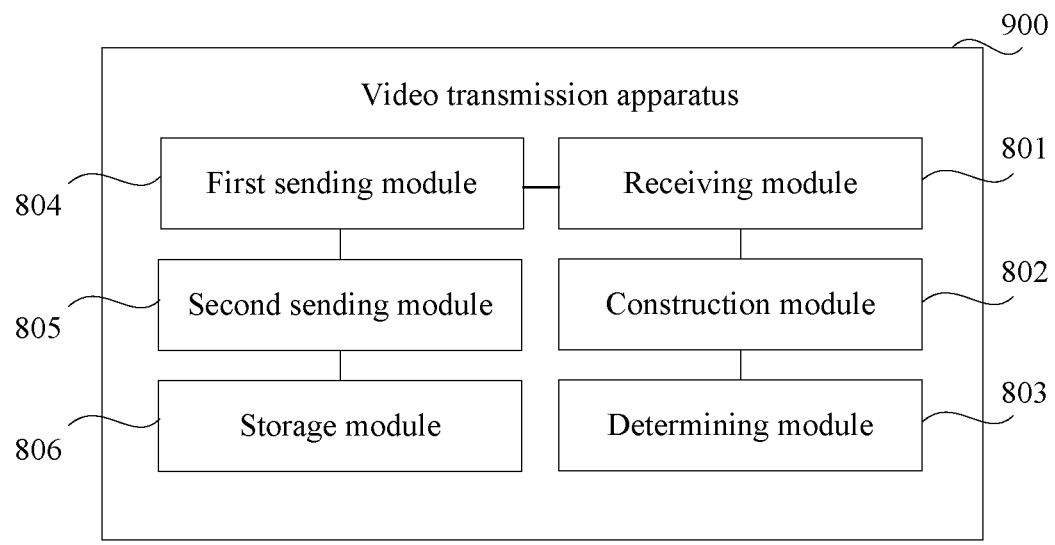
Figure 10:
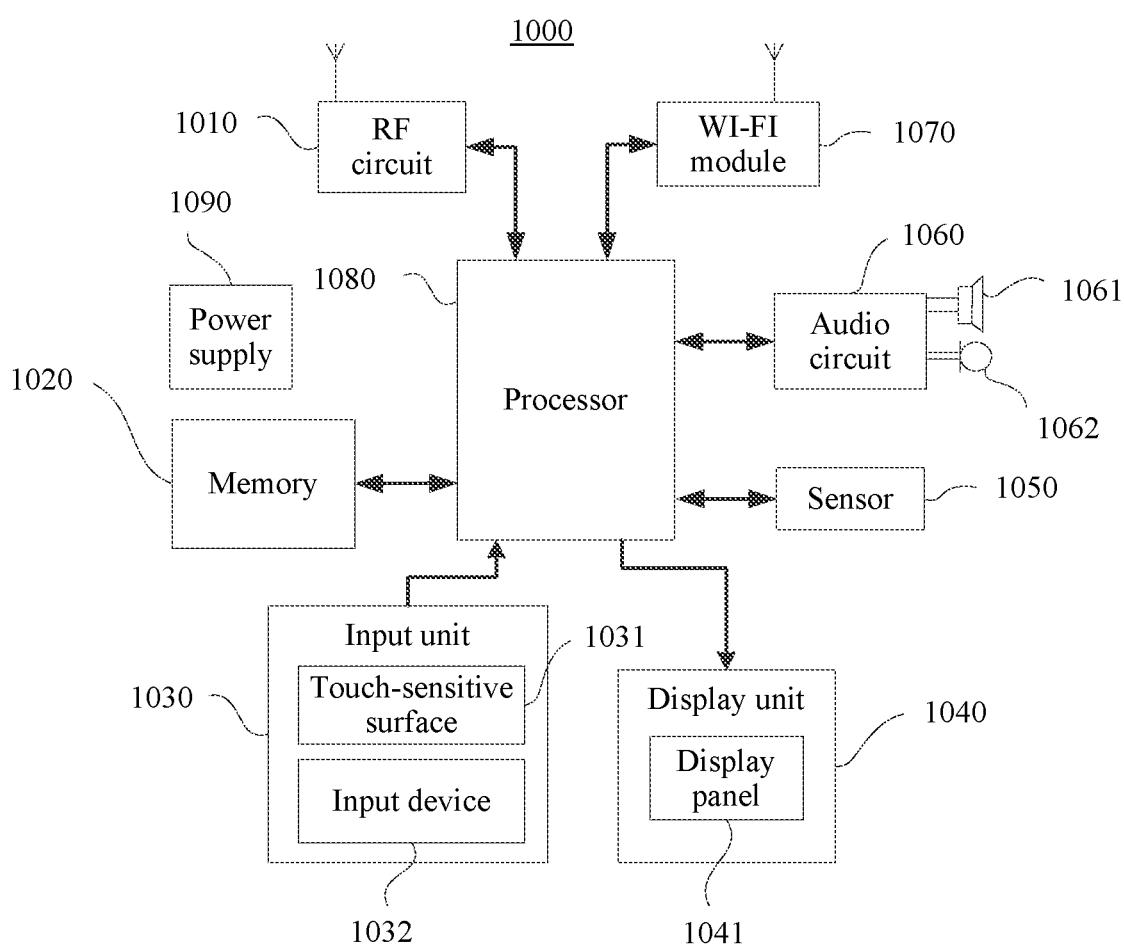
Figure 11:
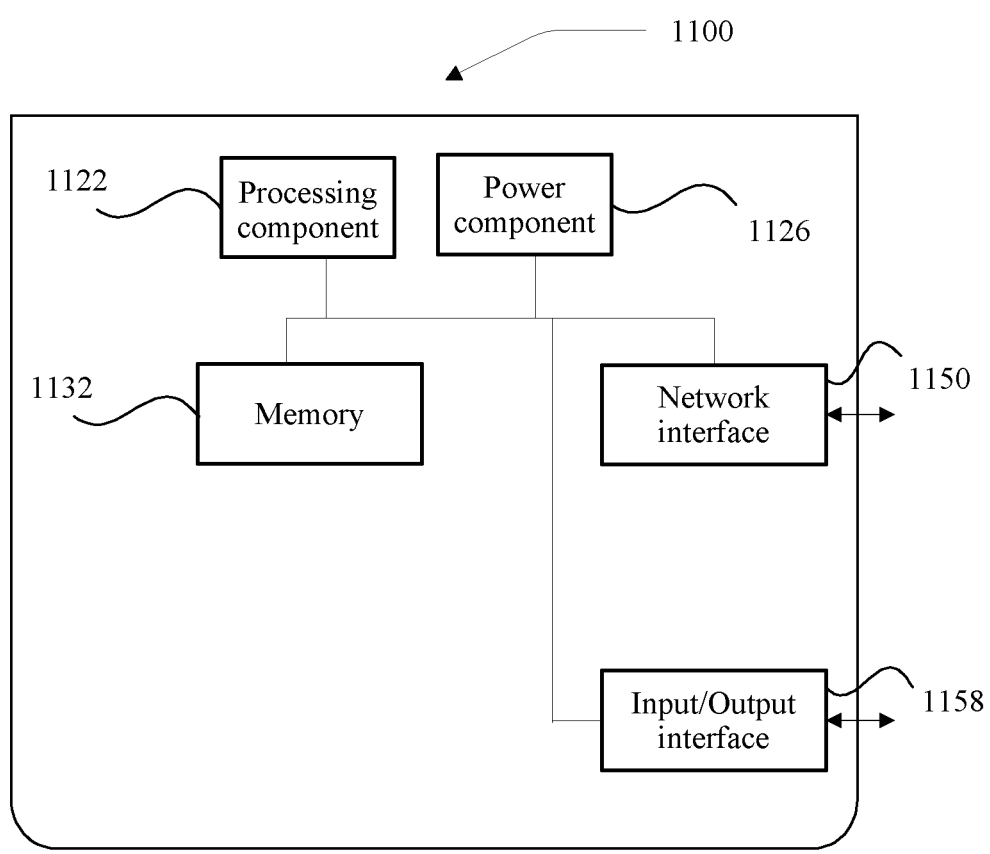

when $\rho=0.03$ and $\beta$ has different values according to an embodiment of this application;

FIG. 4 is a flowchart of some steps of a video transmission method according to an embodiment of this application;

FIG. 5A is a step of a video transmission method according to an embodiment of this application;

FIG. 5B is a schematic diagram of a correspondence between a transmission delay and a quantity k of data blocks according to an embodiment of this application;

FIG. 6 is a block diagram of a video transmission apparatus according to an embodiment of this application;

FIG. 7 is a block diagram of a video transmission apparatus according to an embodiment of this application;

FIG. 8 is a block diagram of a video transmission apparatus according to an embodiment of this application;

FIG. 9 is a block diagram of a video transmission apparatus according to an embodiment of this application;

FIG. 10 is a block diagram of a video transmission apparatus according to an embodiment of this application; and FIG. 11 is a block diagram of a video transmission apparatus according to an embodiment of this application.

DESCRIPTION OF EMBODIMENTS

To make the objectives, technical solutions, and advantages of this application clearer, the following further describes the implementations of this application in detail with reference to the accompanying drawings.

Figure 1:
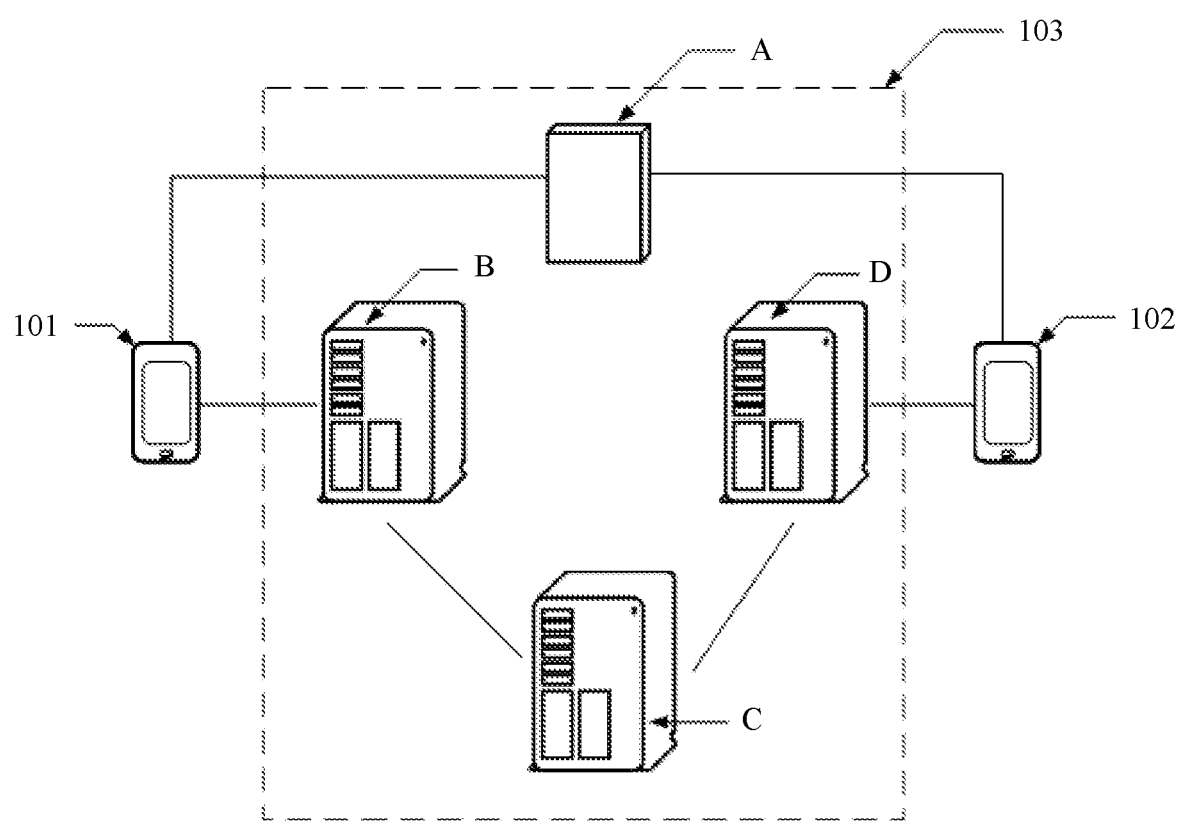
FIG. 1 is a schematic diagram of a live broadcasting network.

Network live broadcasting means live video broadcasting performed using a live broadcasting network. As shown in FIG. 1 a live broadcasting network may include an anchor terminal 101, an audience terminal 102, and a CDN 103 located between the anchor terminal 101 and the audience terminal 102. The CDN network 103 may include a plurality of front-end servers (in FIG. 1, only two front-end servers are used as an example: a front-end server B and a front-end server D), a centralized controller A, and a background storage server C.

In an application, network live broadcasting may include two processes: an uplink of the live video and a downlink of the live video. In the uplink process of the live video, the anchor terminal 101 may shoot the live video, and send an upload request to the centralized controller A in the CDN network 103. After receiving the upload request, the centralized controller A may return an Internet Protocol (IP) address of the front-end server B in the CDN network 103 to the anchor terminal 101 based on a specific scheduling policy. The front-end server B is a front-end server that is in the plurality of front-end servers of the CDN network 103 and that is the closest to the anchor terminal 101 in a geographical location. The anchor terminal 101 may send a video data stream of the live video to the front-end server B based on the received IP address. The front-end server B that receives the video data stream may forward the video data stream to the background storage server C in the CDN network 103.

In the downlink process of the live video, the audience terminal 102 may send a viewing request to the centralized controller A. After receiving the viewing request, the centralized controller A may return an IP address of the front-end server D in the CDN network 103 to the audience terminal 102 based on a specific scheduling policy. The front-end server D is a front-end server that is in the plurality of front-end servers of the CDN network 103 and that is the closest to the audience terminal 102 in a geographical location. The audience terminal 102 may send a data stream obtaining request to the front-end server D based on the received IP address. The front-end server D that receives the data stream obtaining request may obtain a video data stream from the background storage server C, and send the video data stream to the audience terminal 102 such that the audience terminal 102 plays the live video based on the received video data stream.

In the uplink process of the live video, if a packet loss occurs, the anchor terminal needs to retransmit video data, and this easily causes freezing and a delay of the live video. In addition, in the other approaches, the anchor terminal sends the live video to only one front-end server in the CDN network. This single-path video data sending manner causes relatively low uplink bandwidth utilization of the anchor terminal. In actual application, uplink bandwidth of the live broadcasting network is usually relatively small. Based on this, the relatively low uplink bandwidth utilization of the anchor terminal causes a relatively low uplink rate of the live video, and therefore, freezing and a delay of the live video are easily caused.

Figure 2A:
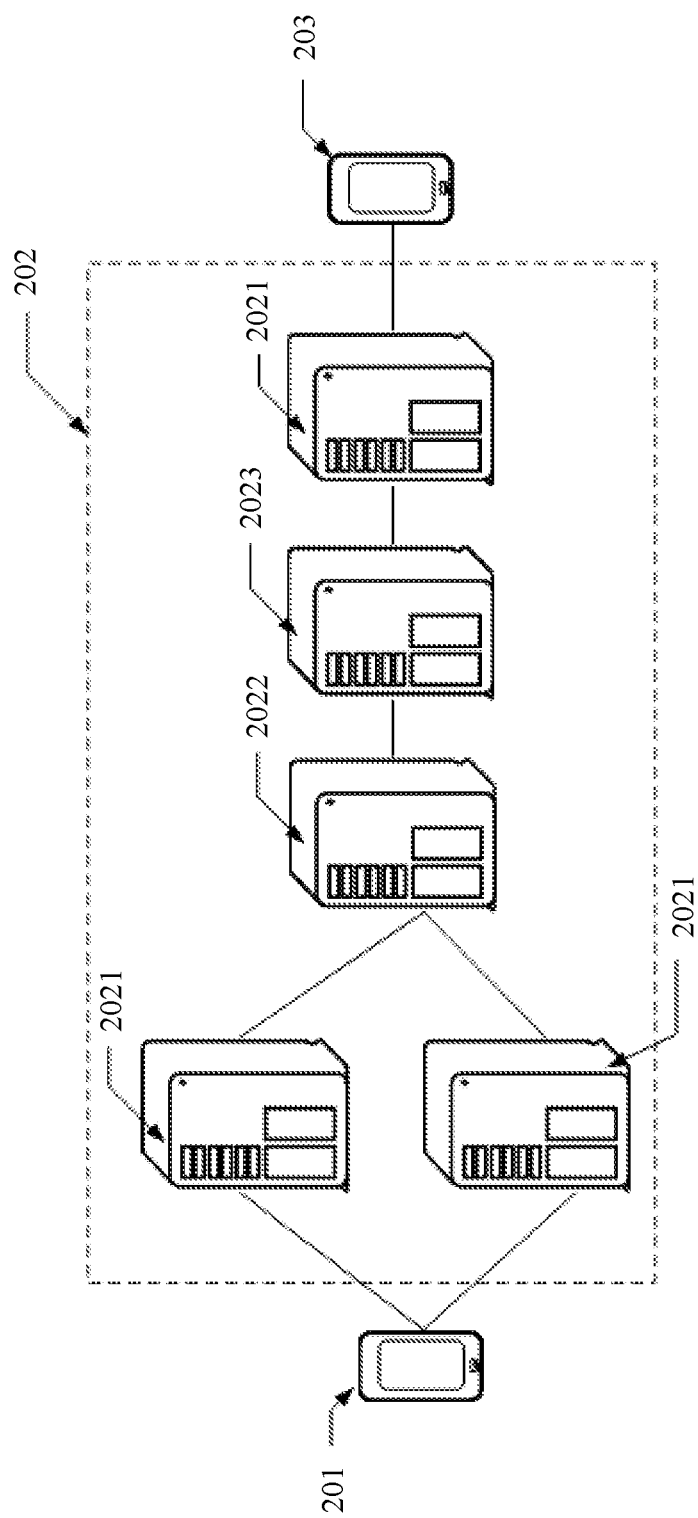
FIG. 2A is a schematic diagram of a live broadcasting network according to an embodiment of this application.

To reduce a probability that freezing and a delay occur in a live video, this application provides a video transmission method. FIG. 2A is a schematic diagram of a live broadcasting network in the video transmission method. As shown in FIG. 2A, the live broadcasting network may include an anchor terminal 201, a CDN network 202, and an audience terminal 203. The anchor terminal 201 and the audience terminal 203 may be electronic devices with a video play function, such as a mobile phone or a tablet computer, and the CDN network 202 may include a plurality of front-end servers 2021, a video decoding server 2022, and a background storage server 2023. In the live broadcasting network shown in FIG. 2A, the anchor terminal 201 may communicate with at least two of the plurality of front-end servers 2021 in the CDN network 202 (FIG. 2A shows only two front-end servers 2021 that communicate with the anchor terminal 201), each of the at least two front-end servers 2021 may communicate with the video decoding server 2022, and the video decoding server 2022 may communicate with the background storage server 2023. The audience terminal 203 may communicate with at least one of the plurality of front-end servers 2021 in the CDN network 202 (FIG. 2A shows only one front-end server 2021 that communicates with the audience terminal 203), and each of the at least one front-end server 2021 may communicate with the background storage server 2023.

Figure 2B:
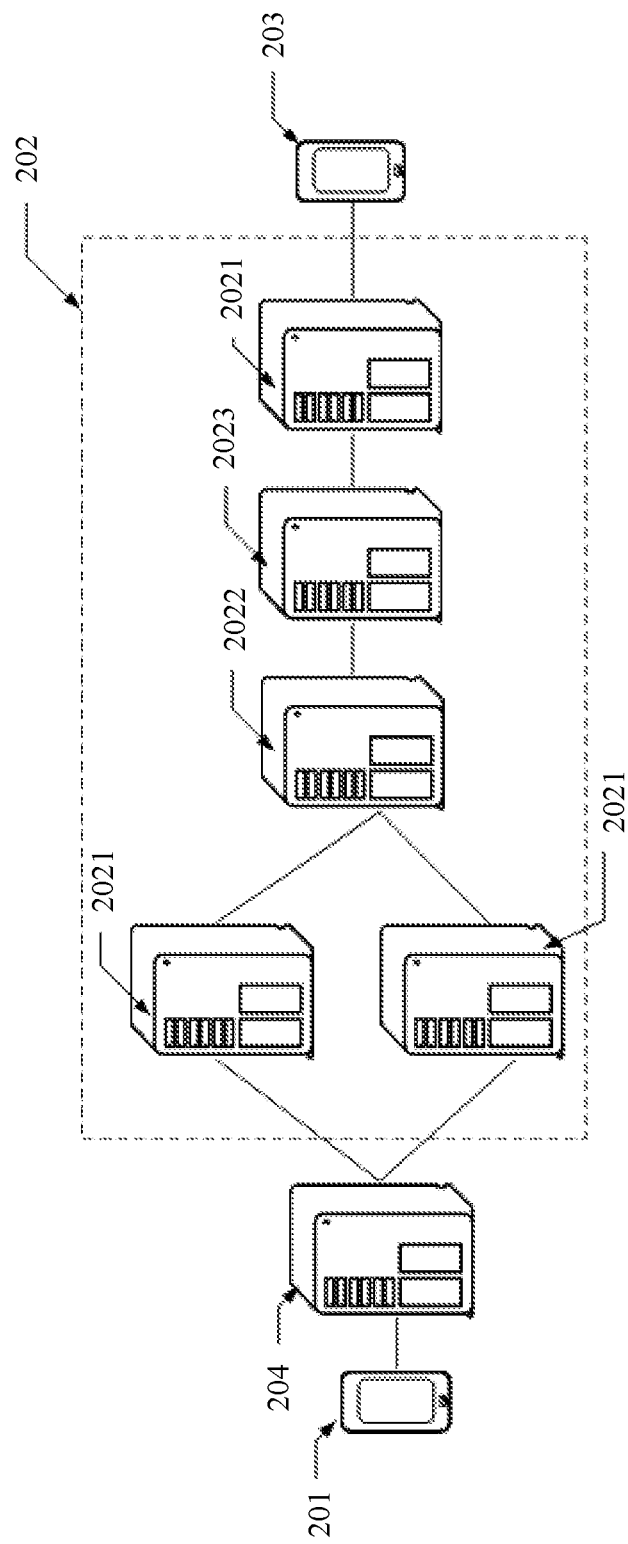
FIG. 2B is a schematic diagram of another live broadcasting network according to an embodiment of this application.

FIG. 2B is a schematic diagram of another live broadcasting network in a video transmission method according to this application. An architecture of the live broadcasting network shown in FIG. 2B is basically the same as an architecture of the live broadcasting network shown in FIG. 2A. The live broadcasting network also includes an anchor terminal 201, a CDN network 202, and an audience terminal 203, and the CDN network 202 may also include a plurality of front-end servers 2021, a video decoding server 2022, and a background storage server 2023. The architecture of the live broadcasting network shown in FIG. 2B differs from the architecture of the live broadcasting network shown in FIG. 2A in that the live broadcasting network shown in FIG. 2B further includes a video coding server 204. In the live broadcasting network in FIG. 2B, the anchor terminal 201 may communicate with the video coding server 204, the video coding server 204 may communicate with at least two of the plurality of front-end servers 2021 in the CDN network 202 (FIG. 2B shows only two front-end servers 2021 that communicate with the video coding server 204), and each of the at least two front-end servers 2021 may communicate with the video decoding server 2022.

It should be noted that in an embodiment of this application, in the live broadcasting networks shown in FIG. 2A and FIG. 2B, the CDN network 202 may further include a centralized controller. In the live broadcasting network shown in FIG. 2A, the centralized controller may separately communicate with the anchor terminal 201 and the audience terminal 203. In the live broadcasting network shown in FIG. 2B, the centralized controller may separately communicate with the video coding server 204 and the audience terminal 203.

Figure 3A:
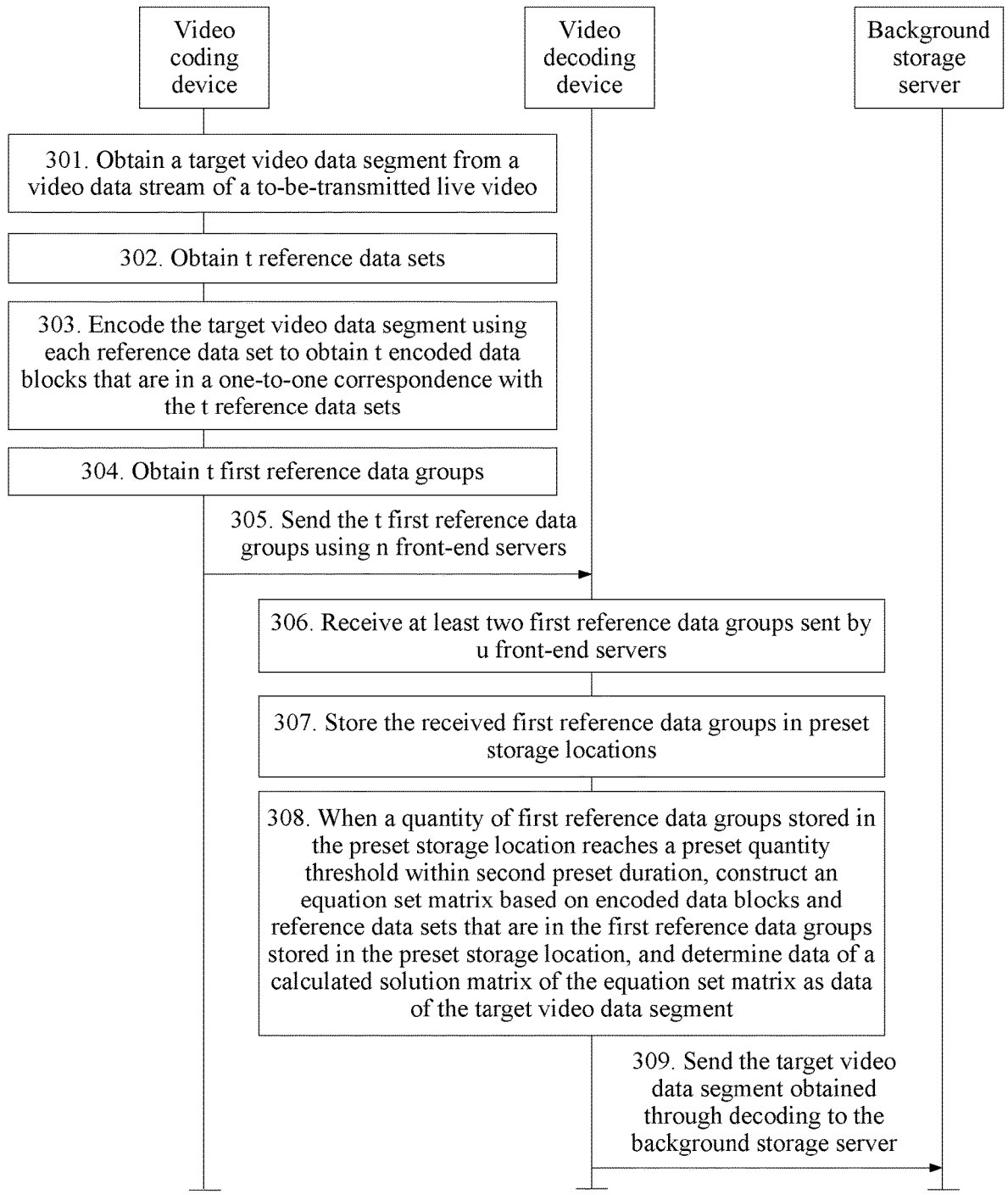
FIG. 3A is a flowchart of a video transmission method according to an embodiment of this application.

FIG. 3A is a flowchart of a video transmission method according to an embodiment of this application. The video transmission method may be applied to the live broadcasting network shown in FIG. 2A or FIG. 2B. As shown in FIG. 3A, the video transmission method may include the following steps.

Step 301: A video coding device obtains a target video data segment from a video data stream of a to-be-transmitted live video.

It should be noted that the video coding device may be the anchor terminal 201 in FIG. 2A, or may be the video coding server 204 in FIG. 2B. That is, in this embodiment of this application, the anchor terminal may perform a technical process of obtaining the target video data segment and encoding the target video data segment in a subsequent step, or the video coding server may perform a technical process of obtaining the target video data segment and encoding the target video data segment in a subsequent step.

When the video coding device is an anchor terminal, a video coding server may not need to be deployed in a live broadcasting network such that hardware overheads can be reduced, and deployment costs of the live broadcasting network can be reduced. When the video coding device is a video coding server, the anchor terminal does not need to perform a technical process of encoding the target video data segment. Therefore, a video coding function does not need to be added to a network live broadcasting application installed on the anchor terminal, that is, the existing network live broadcasting application does not need to be modified. Therefore, software overheads are relatively low, and it can be ensured that the video transmission method provided in this embodiment of this application can be compatible with the existing network live broadcasting application.

When the video coding device is an anchor terminal, in step 301, the video coding device may obtain the video data stream of the to-be-transmitted live video shot by the video coding device, and continuously obtain a plurality of video data segments from the video data stream. The target video data segment is one of the plurality of video data segments. In this embodiment of this application, only a process of encoding, decoding, and transmitting the target video data segment is used as an example to describe the technical solution provided in this application. A manner of processing another video data segment in this application is the same as that of the target video data segment.

When the video coding device is a video coding server, in step 301, the video coding device may obtain the video data stream of the to-be-transmitted live video sent by the anchor terminal, and continuously obtain a plurality of video data segments from the received video data stream. The target video data segment is one of the plurality of video data segments. It should be noted that, when the video coding device is a video coding server, the video coding device may be disposed at a location, such as a base station, that is relatively close to the anchor terminal geographically such that network communication quality between the video coding device and the anchor terminal can be ensured, thereby improving a rate at which the anchor terminal sends the video data stream to the video coding device.

In an application, the target video data segment may include k data blocks of a same size, where k is a positive integer greater than or equal to 1. In this embodiment of this application, the size of the data block may be set based on a video data stream encapsulation format of the to-be-transmitted live video. A transport stream (ts) encapsulation format is used as an example. In the ts encapsulation format, a size of one ts packet is 188 bytes. Because a size of a maximum transmission unit (MTU) in an Ethernet is 1500 bytes, one data frame in the Ethernet can encapsulate a maximum of 7 ts packets, that is, 1316 bytes. In this case, the size of the data block may be set to 1316 bytes.

As described above, when the video coding device is a video coding server, the video coding device needs to receive the video data stream of the to-be-transmitted live video sent by the anchor terminal, and obtain the target video data segment from the video data stream, that is, obtain the k data blocks from the video data stream to form the target video data segment. However, in some cases, network communication quality between the anchor terminal and the video coding device is relatively poor, and therefore, a rate of transmitting the video data stream between the anchor terminal and the video coding device is relatively low. In this case, the video coding device cannot obtain the k data blocks from the received video data streams, that is, obtain the target video data segment, because the video coding device cannot receive enough video data streams.

To avoid a case in which a delay of obtaining the target video data segment by the video coding device is too long and affects an uplink rate of the to-be-transmitted live video, in an embodiment of this application, first preset duration may be set for the video coding device. The video coding device may start timing after obtaining the first data block of the target video data segment from the video data stream, and monitor, in a timing process, a quantity of data blocks obtained by the video coding device. When the video coding device detects, at any moment in the first preset duration, that the quantity of data blocks obtained by the video coding device reaches k, the video coding device may form the target video data segment using the obtained k data blocks. When the quantity of data blocks obtained by the video coding device is still less than k at the end of the first preset duration, the video coding device may pad the obtained data blocks using preset data (for example, the preset data may be 0), to obtain k data blocks, and then the video coding device may form the target video data segment using the k data blocks obtained through padding. In this way, duration in which the video coding device obtains the target video data segment does not exceed the first preset duration, thereby avoiding a case in which a delay of obtaining the target video data segment by the video coding device is too long and then affects the uplink rate of the to-be-transmitted live video.

After the video coding device obtains the target video data segment, the video coding device may encode the target video data segment. A technical process of encoding the target video data segment may include the following steps 302 and 303.

Step 302: The video coding device obtains t reference data sets, where t is a positive integer greater than or equal to k.

When encoding the target video data segment, the video coding device may obtain the t reference data sets, where each reference data set may include k pieces of reference data, and the k pieces of reference data are in a one-to-one correspondence with the k data blocks included in the target video data segment. In addition, all the k pieces of reference data included in each of the t reference data sets may construct one reference vector, and every two of constructed t reference vectors are linearly unrelated to each other.

For example, an $i^{th}$ reference data set in the t reference data sets may include k pieces of reference data, and the k pieces of reference data are $C_{i1}, C_{i2}, \ldots, C_{iu}, \ldots, C_{ik}$, where $C_{iu}$ corresponds to a $u^{th}$ data block in the k data blocks included in the target video data segment. For example, a $j^{th}$ reference data set in the t reference data sets may also include k pieces of reference data, and the k pieces of reference data are $C_{j1}, C_{j2}, \ldots, C_{ju}, \ldots, C_{jk}$, where $C_{ju}$ corresponds to a $u^{th}$ data block in the k data blocks included in the target video data segment. The $i^{th}$ reference data set may construct a vector $C_{i1}, C_{i2}, \ldots, C_{iu}, \ldots, C_{ik}$, the $j^{th}$ reference data set may construct a vector $C_{j1}, C_{j2}, \ldots, C_{ju}, \ldots, C_{jk}$, and the two vectors are linearly unrelated to each other.

Step 303: The video coding device encodes the target video data segment using each reference data set, to obtain t encoded data blocks that are in a one-to-one correspondence with the t reference data sets.

In this embodiment of this application, step 303 is described below using a technical process in which the video coding device encodes the target video data segment using the $i^{th}$ reference data set in the t reference data sets to obtain an $i^{th}$ encoded data block in the t encoded data blocks as an example.

The video coding device may multiply each piece of reference data included in the $i^{th}$ reference data set by a data block that is in the target video data segment and that corresponds to the $i^{th}$ reference data set, to obtain k products, and then the video coding device may add the k products to obtain the $i^{th}$ encoded data block.

For example, the $i^{th}$ reference data set may include the following k pieces of reference data $C_{i1}, C_{i2}, \ldots, C_{iu}, \ldots, C_{ik}$, and the target video data segment may include the following k data blocks $b_1, b_2, \ldots, b_u, \ldots, b_k$, where $C_{iu}$ corresponds to $b_u$. The video coding device encodes the target video data segment based on the $i^{th}$ reference data set, to obtain the $i^{th}$ encoded data block $a_i = C_{i1} \times b_1 + C_{i2} \times b_2 + \ldots + C_{iu} \times b_u + \ldots + C_{ik} \times b_k$.

It may be learned from the foregoing descriptions that a technical process in which the video coding device encodes the target video data segments using the t reference data sets to obtain the t encoded data blocks may be actually represented by multiplying a coefficient matrix in an equation set matrix by a solution matrix to obtain a constant-term matrix. The coefficient matrix includes the t reference data sets, the solution matrix includes the k data blocks in the target video data segment, and the constant-term matrix includes the t encoded data blocks. Further, the encoding process may be represented as:

$$\begin{bmatrix} C_{11} & C_{12} & \ldots & C_{1u} & \ldots & C_{1k} \\ C_{21} & C_{22} & \ldots & C_{2u} & \ldots & C_{2k} \\ \ldots & \ldots & \ldots & \ldots & \ldots & \ldots \\ C_{i1} & C_{i2} & \ldots & C_{iu} & \ldots & C_{ik} \\ \ldots & \ldots & \ldots & \ldots & \ldots & \ldots \\ C_{t1} & C_{t2} & \ldots & C_{tu} & \ldots & C_{tk} \end{bmatrix} \times \begin{bmatrix} b_1 \\ b_2 \\ \ldots \\ b_u \\ \ldots \\ b_k \end{bmatrix} = \begin{bmatrix} a_1 \\ a_2 \\ \ldots \\ a_i \\ \ldots \\ a_t \end{bmatrix}.$$

Step 304: The video coding device obtains t first reference data groups.

After obtaining the t encoded data blocks after encoding the target video data segment, the video coding device may obtain the t first reference data groups, where each first reference data group may include one encoded data block and a reference data set corresponding to the encoded data block. For example, an $i^{th}$ first reference data group in the t first reference data groups may include the $i^{th}$ encoded data block a in the t encoded data blocks and the $i^{th}$ reference data set in the t reference data sets, and the $i^{th}$ reference data set includes $C_{i1}, C_{i2}, \ldots, C_{iu}, \ldots, C_{ik}$.

Step 305: The video coding device sends the t first reference data groups to the video decoding device using n front-end servers, where n is a positive integer greater than or equal to 1.

In this embodiment of this application, the video coding device may send at least one first reference data group to each of the n front-end servers, and a sum of quantities of first reference data groups sent by the video coding device to the n front-end transmitters is equal to t.

Optionally, the video coding device may generate a reference data packets. Each reference data packet may include at least one first reference data group, the a reference data packets may include t first reference data groups, and a is a positive integer greater than or equal to 1. Then, the video coding device may send the a reference data packets to the video decoding device using the n front-end servers, to send the t first reference data groups to the video decoding device. It should be noted that, in an embodiment of this application, the reference data packet may further include an identifier of the target video data segment and/or an identifier of a live broadcasting channel to which the to-be-transmitted live video belongs. It should be further noted that the video decoding device may be the video decoding server 2022 in FIG. 2A or FIG. 2B.

In an embodiment of this application, a format of the reference data packet may be a UDT format. That is, the video coding device may send the a reference data packets to the video decoding device based on a UDT protocol.

In the other approaches, a data transmission protocol used in a live broadcasting network is usually a TCP, and a congestion control mechanism of the TCP protocol is AIMD mechanism. In the AIMD mechanism, when a packet loss occurs on a link, transmit windows of the link are halved. For example, when a packet loss occurs between a sending device A and a receiving device B, the AIMD mechanism halves transmit windows of the sending device A. When transmit windows are halved, a data transmission rate is relatively seriously affected. Therefore, when a video data stream is transmitted in the live broadcasting network based on the TCP protocol, a packet loss relatively seriously affects a transmission rate of the video data stream, causing a phenomenon that a delay is very long and freezing occurs very frequently when an audience terminal plays the live video.

To reduce impact exerted by the packet loss on the transmission rate of the video data stream in the live broadcasting network, in this embodiment of this application, the live broadcasting network may transmit the video data stream based on a UDT protocol. To be specific, the video coding device sends the a reference data packets to the video decoding device based on the UDT protocol. A congestion control mechanism of the UDT protocol is DAIMD mechanism. In the DAIMD mechanism, when a packet loss occurs on a link, a transmit window may be reduced based on available bandwidth of the link, and a reduction amplitude of the transmit window is a random number between ⅛ and ½. Therefore, impact exerted by the packet loss on the transmission rate of the video data stream in the live broadcasting network can be reduced in comparison with that in the TCP protocol.

In actual application, before sending the t first reference data groups, the video coding device may establish communication connections to r front-end servers in a CDN network, where r is a positive integer greater than or equal to n. In some cases, the video coding device may directly send the t first reference data groups to the video decoding device using the r front-end servers. In some other cases, the video coding device may further determine n front-end servers with better network communication quality from the r front-end servers based on a data transmission rate between the video coding device and each of the r front-end servers, and send the t first reference data groups to the video decoding device using the n front-end servers. Because the network communication quality between the video coding device and the determined n front-end servers is relatively good, the video coding device sends data at a relatively fast rate using the n front-end servers such that an uplink rate of the video data stream can be ensured.

In an embodiment of this application, network communication quality between the video coding device and a front-end server may be represented using a utility value of the front-end server. A larger utility value indicates better network communication quality between the front-end server and the video coding device. In a process of determining the n front-end servers from the r front-end servers, the video coding device may calculate a utility value of each of the r front-end servers, and determine the n front-end servers from the r front-end servers in descending order of utility values, and utility values of the n front-end servers are greater than a utility value of another front-end server in the r front-end servers.

In an embodiment of this application, the utility value of the front-end server may be calculated using the following third formula:

$$u_j = \frac{thr_j}{1 + e^{\beta \times (\rho_j - \rho)}}.$$

In the third formula, $u_j$ is a utility value of a $j^{th}$ front-end server in the r front-end servers, $thr_j$ is a data transmission rate between the video coding device and the $j^{th}$ front-end server, $\rho_j$ is a packet loss rate between the video coding device and the $j^{th}$ front-end server, $\rho$ is an average packet loss rate of the live broadcasting network and may be set based on an empirical value, for example, $\rho$ may be set to 0.03, $\beta$ is a constant, and e is a base of a natural logarithm.

In actual application, network communication quality between the video coding device and the front-end server is usually determined by a data transmission rate and a packet loss rate that are between the video coding device and the front-end server. The data transmission rate may reflect available bandwidth between the video coding device and the front-end server, and the packet loss rate may reflect a path congestion degree between the video coding device and the front-end server. Therefore, in the third formula, the utility value of the front-end server may be calculated using a data transmission rate and a packet loss rate that are between the video coding device and the front-end server.

Figure 3B:
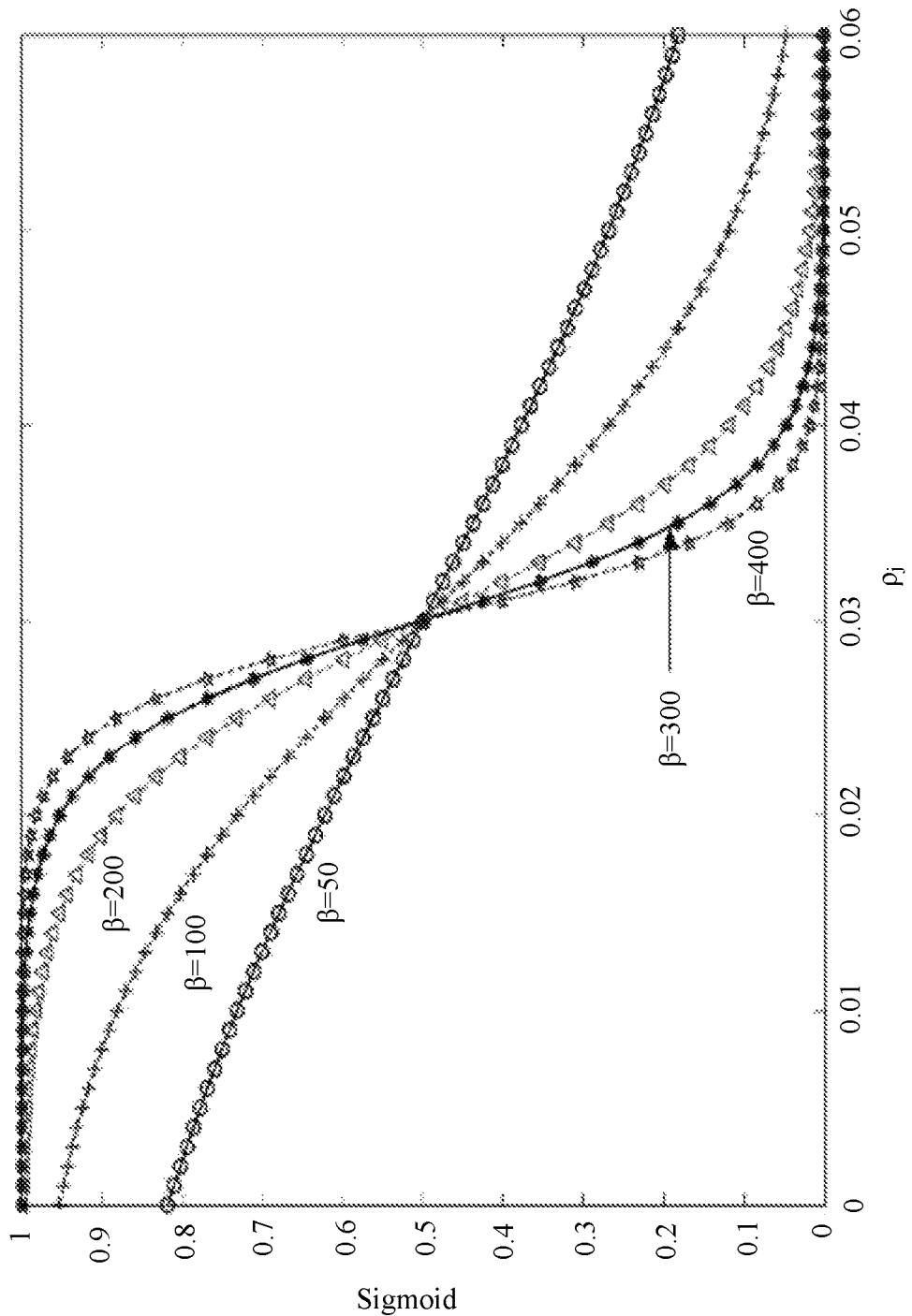
FIG. 3B is a diagram of a relationship curve between $\rho_j$ and $$\frac{1}{1+e^{\beta \times (\rho_j - \rho)}}$$

Generally, the packet loss rate greatly affects network communication quality between the video coding device and the front-end server, and this is because when a packet loss occurs, a transmit window of the video coding device is decreased, and the video coding device further needs to retransmit a data packet. In the third formula, a value of the constant $\beta$ may be adjusted to adjust importance of the packet loss rate to the utility value. Further, when $\rho_j > \rho$, a larger value of $\beta$ leads to a higher rate at which the utility value of the $j^{th}$ front-end server decreases as $\rho_j$ increases. FIG. 3B shows a relationship curve between $\rho_j$ and a sigmoid function $$\frac{1}{1 + e^{\beta \times (\rho_j - \rho)}}$$

when $\rho = 0.03$ and $\beta$ has different values. It may be learned from FIG. 3B that a larger value of $\beta$ leads to a higher rate at which the sigmoid function $$\frac{1}{1 + e^{\beta \times (\rho_j - \rho)}}$$

decreases as $\rho_j$ increases. In some cases, if the packet loss rate cannot be obtained, the value of $\beta$ can be set to 0. In this way, the packet loss rate does not affect the utility value.

In an embodiment of this application, in a process of sending the t first reference data groups to the video decoding device using the n front-end servers, the video coding device may send different quantities of first reference data groups to the video decoding device using each of the n front-end servers. For example, the video coding device may send $y_1$ first reference data groups to the video decoding device using the first front-end server in the n front-end servers, send $y_2$ first reference data groups to the video decoding device using the second front-end server, . . . , send $y_l$ first reference data groups to the video decoding device using an $l^{th}$ front-end server, . . . , and send $y_n$ first reference data groups to the video decoding device using the $n^{th}$ front-end server, and $y_1 + y_2 + \ldots + y_l + \ldots + y_n = t$.

Generally, network communication quality between a front-end server with a relatively large utility value and the video coding device is relatively good, and the video coding device may send a relatively large quantity of first reference data groups to the front-end server. Network communication quality between a front-end server with a relatively small utility value and the video coding device is relatively poor, and to reduce a data transmission delay, the video coding device may send a relatively small quantity of first reference data groups to the front-end server.

To implement the foregoing technical process, before sending the t first reference data groups, the video coding device may calculate, based on the following fourth formula, a quantity of first reference data groups corresponding to each of the n front-end servers, and then the video coding device may send the corresponding quantity of first reference data groups to each front-end server such that the front-end server sends the received first reference data groups to the video decoding device. The fourth formula is:

$$y_l = \frac{t \times u_l}{\sum_{w=1}^{n} u_w}.$$

In the fourth formula, $y_l$ is a quantity of first reference data groups corresponding to the first front-end server in the n front-end servers, $u_l$ is a utility value of the first front-end server, and $\sum_{w=1}^{n} u_w$ is a sum of utility values of the n front-end servers.

It should be noted that when the video coding device is an anchor terminal, and the anchor terminal is a multi-homed terminal (the multi-homed terminal may exchange data with a network in different network connection manners at the same time), the video coding device may send the t first reference data groups to the video decoding device in different network connection manners. The different network connection manners may include network connection in a WI-FI manner, mobile communications network connection, fixed telephone network connection, and the like. In this way, uplink bandwidth of the video coding device can be increased such that a rate at which the video coding device sends the t first reference data groups is increased, and then an uplink rate of the video data stream of the to-be-transmitted live video is increased.

After the video coding device sends the t first reference data groups to the video decoding device using the n front-end servers, the video coding device may further detect a packet loss rate between the video coding device and each of the n front-end servers in real time. When the video coding device detects that a packet loss rate between the video coding device and one or more front-end servers is greater than a preset packet loss rate threshold, the video coding device may retransmit the first reference data groups. The preset packet loss rate threshold may be set by a person skilled in the art.

Optionally, in a process of retransmitting the first reference data groups, the video coding device may obtain d reference data sets (d is a positive integer greater than or equal to 1), where k pieces of reference data included in each of the d reference data sets may construct one reference vector, every two of constructed d reference vectors are linearly unrelated to each other, and each of the constructed d reference vectors is linearly unrelated to any one of the t reference vectors constructed using the t reference data sets. Then, the video coding device may encode the target video data segment based on a technical process similar to step 303 and step 304 using the d reference data sets, to obtain d first reference data groups. Then, the video coding device may send the d first reference data groups to the video decoding device using one or more front-end servers with a highest utility value in the n front-end servers (a packet loss rate between the video coding device and the one or more front-end servers needs to be less than the preset packet loss rate threshold).

Step 306: The video decoding device receives first reference data groups sent by u front-end servers, where 1<u≤n.

The video decoding device may receive a reference data packet sent by the front-end server, and extract the first reference data group from the reference data packet. In an application, if no packet loss occurs between the video coding device and the n front-end servers, and no packet loss occurs between the video decoding device and the n front-end servers, the video decoding device may receive the a reference data packets sent by the n front-end servers, and extract the t first reference data groups from the a reference data packets. However, when a packet loss occurs between the video coding device and the n front-end servers, or a packet loss occurs between the video decoding device and the n front-end servers (in some extreme cases, all reference data packets sent by the video coding device using a front-end server may be lost), a quantity of reference data packets received by the video decoding device is less than a, and a quantity of first reference data groups extracted by the video decoding device is also less than t.

Step 307: The video decoding device stores the received first reference data groups in preset storage locations.

In actual application, because duration required to send reference data groups obtained by the video coding device through encoding from different front-end servers to the video decoding device is different, it is very likely that the video decoding device receives reference data groups obtained by encoding a video data segment before all reference data groups obtained by encoding a previous video data segment are received. For example, when the video decoding device has received b (1≤b<t) reference data groups in t reference data groups obtained by encoding a $q^{th}$ video data segment in the video data stream, the video decoding device further receives o (1≤o<t) reference data groups in t reference data groups obtained by encoding a $(q+1)^{th}$ video data segment in the video data stream.

In this case, the preset storage location may need to simultaneously store reference data groups obtained by encoding a plurality of video data segments. To avoid overflow of the reference data groups from the preset storage location due to excessively small storage space of the preset storage location, in this embodiment of this application, a storage space size of the preset storage location may be set based on maximum delay duration, minimum delay duration, and generation duration of the video data segment in the video data stream. The storage space size of the preset storage location meets a sixth formula, and the sixth formula is:

$$Q = \frac{\max(\text{delay}) - \min(\text{delay})}{\text{generate\_time}} \times s.$$

In the sixth formula, Q is the storage space size of the preset storage location, max(delay) is the maximum delay duration, the maximum delay duration is maximum duration required to send the reference data group from the video coding device to the video decoding device through the front-end server, min(delay) is the minimum delay duration, the minimum delay duration is minimum duration required to send the reference data group from the video coding device to the video decoding device through the front-end server, generate_time is the generation duration of the video data segment, the generation duration of the video data segment is duration required by the anchor terminal to generate k data blocks, and s is a data volume size of the video data segment.

In actual application, alternatively, the generation duration of the video data segment may be usually equal to play duration of the video data segment. The play duration of the video data segment is duration in which the audience terminal can play the to-be-transmitted live video based on the k data blocks. The play duration of the video data segment may be calculated using the following seventh formula:

$$\text{play\_time} = \frac{k \times B}{\text{bit\_rate}}.$$

In the seventh formula, play_time is the play duration of the video data segment, B is a data volume size of the data block, and bit_rate is a video play bit rate of the to-be-transmitted live video.

B is the size of the data block, and bit_rate is the play bit rate of the to-be-transmitted live video.

When the generation duration of the video data segment is equal to the play duration of the video data segment, the sixth formula may be deformed as follows based on the seventh formula:

$$Q = \frac{\max(\text{delay}) - \min(\text{delay})}{\text{play\_time}} \times s = \frac{\max(\text{delay}) - \min(\text{delay})}{\frac{k \times B}{\text{bit\_rate}}} \times k \times B = [\max(\text{delay}) - \min(\text{delay})] \times \text{bit\_rate}.$$

Step 308: When a quantity of first reference data groups stored in the preset storage location reaches a preset quantity threshold within second preset duration, the video decoding device constructs an equation set matrix based on encoded data blocks and reference data sets that are in the first reference data groups stored in the preset storage location, and determines data of a calculated solution matrix of the equation set matrix as data of the target video data segment.

It should be noted that the preset quantity threshold may be a quantity of first reference data groups required by the video decoding device to successfully obtain the target video data segment through decoding. That is, the video decoding device can successfully obtain the target video data segment through decoding only when a quantity of received first reference data groups reaches the preset quantity threshold.

In an ideal case, to be specific, when no packet loss occurs between the video coding device and the n front-end servers and no packet loss occurs between the video decoding device and the n front-end servers, the video coding device may send only first reference data groups whose quantity is the preset quantity threshold to the video decoding device such that the video decoding device obtains the target video data segment through decoding based on the first reference data groups whose quantity is the preset quantity threshold and that are sent by the video coding device. That is, in the ideal case, a value of t may be equal to the preset quantity threshold.

However, in actual application, a non-ideal case may occur, to be specific, a packet loss may occur between the video coding device and the n front-end servers, or a packet loss may occur between the video decoding device and the n front-end servers. In this case, a quantity of first reference data groups that can be received by the video decoding device is less than t. Therefore, in this case, if the value of t is equal to the preset quantity threshold, the video decoding device definitely cannot successfully obtain the target video data segment through decoding. To avoid this case, the value of t may be greater than the preset quantity threshold, to be specific, the video coding device may send first reference data groups that are greater than the preset quantity threshold to the video decoding device. In this way, even if the video decoding device cannot receive some first reference data groups in the t first reference data groups due to a packet loss, the video decoding device may still receive the first reference data groups whose quantity is the preset quantity threshold because the value of t is greater than the preset quantity threshold, and in this case, the video decoding device can still successfully obtain the target video data segment through decoding.

However, even if the value of t is set to be greater than the preset quantity threshold, when a packet loss occurs in the non-ideal case, a quantity of first reference data groups that can be received by the video decoding device may be still less than the preset quantity threshold. In this case, the video decoding device cannot successfully obtain the target video data segment through decoding. In this case, it is meaningless for the video decoding device to continue to wait for receiving the first reference data group, otherwise storage space of the preset storage location is wasted.

To avoid the foregoing case, in an embodiment of this application, the second preset duration may be set for the video decoding device. The video decoding device may start timing after storing the received first, first reference data group in the preset storage location, and monitor, in real time in a timing process, a quantity of first reference data groups stored in the preset storage location. When the video decoding device detects, in a period of time from the start of the timing to the second preset duration, that a quantity of first reference data groups stored in the preset storage location reaches the preset quantity threshold, the video decoding device may perform decoding based on the first reference data groups whose quantity is the preset quantity threshold, to obtain the target video data segment.

However, when the quantity of first reference data groups stored in the preset storage location is still less than the preset quantity threshold at the end of the second preset duration, it indicates that a packet loss may have occurred, and the video decoding device cannot receive the first reference data groups whose quantity is the preset quantity threshold due to the packet loss. In this case, the video decoding device may delete the first reference data group stored in the preset storage location and send a current decoding difference to the video coding device, or the video decoding device may not delete the first reference data group stored in the preset storage location, but directly send a current decoding difference to the video coding device. The current decoding difference is used to reflect a quantity of first reference data groups that the video decoding device lacks before successfully obtaining the target video data segment through decoding, that is, the current decoding difference may be an absolute value of a difference between a quantity of first reference data groups (that is, a quantity of first reference data groups received by the video decoding device) stored in the preset storage location at the end of the second preset duration and the preset quantity threshold.

After receiving the current decoding difference, the video coding device may determine whether the current decoding difference is greater than a preset difference threshold (the preset difference threshold may be 0). When the video coding device determines that the current decoding difference is greater than the preset difference threshold, it indicates that the video decoding device cannot successfully obtain the target video data segment through decoding, and in this case, the video coding device needs to retransmit the first reference data groups to the video decoding device. Optionally, in a process of retransmitting the first reference data groups, the video coding device may obtain m reference data sets (m is a positive integer greater than or equal to k), where k pieces of reference data included in each of the m reference data sets may construct one reference vector, and every two of constructed m reference vectors are linearly unrelated to each other. Then, the video coding device may encode the target video data segment using each of the m reference data sets based on a technical process similar to step 303 to step 305, to obtain m encoded data blocks that are in a one-to-one correspondence with the m reference data sets, and then send m first reference data groups to the video decoding device using q front-end servers (q is a positive integer greater than or equal to 1), where each of the m first reference data groups includes one of the m encoded data blocks and a reference data set corresponding to the encoded data block.

In actual application, when the video decoding device deletes the first reference data group stored in the preset storage location, m may be equal to t. When the video decoding device does not delete the first reference data group stored in the preset storage location, m may be greater than or equal to the current decoding difference, and in this case, the m reference vectors constructed by the m reference data sets need to be linearly unrelated to any one of the t reference vectors constructed by the t reference data sets, and the constructed m reference vectors further need to be linearly unrelated to any one of the d reference vectors constructed by the d reference data sets. If the video decoding device deletes the first reference data group, a case in which reference data groups obtained by encoding other video data segments overflow from the preset storage location because the first reference data group occupies the preset storage location for excessively long time can be avoided. If the video decoding device does not delete the first reference data group, a quantity of first reference data groups subsequently retransmitted by the video coding device to the video decoding device can be reduced, thereby saving network resources.

It should be noted that when the video decoding device receives, in the second preset duration, the first reference data groups whose quantity is the preset quantity threshold, the video decoding device may also send the current decoding difference to the video coding device. In this case, the current decoding difference may be 0. In this case, the video coding device may not respond to the current decoding difference.

The second preset duration is set for the video decoding device such that it can be ensured that duration in which the video decoding device waits to receive the first reference data group does not exceed the second preset duration. When the video decoding device has not received the first reference data groups whose quantity is the preset quantity threshold at the end of the second preset duration, the video decoding device may instruct, by sending the current decoding difference to the video coding device, the video coding device to retransmit the first reference data group.

As described above, in the second preset duration, when detecting that the quantity of first reference data groups stored in the preset storage location reaches the preset quantity threshold, the video decoding device may perform decoding based on the first reference data groups whose quantity is the preset quantity threshold, to obtain the target video data segment. In a decoding process, the video decoding device may parse the first reference data groups whose quantity is the preset quantity threshold, to obtain encoded data blocks whose quantity is the preset quantity threshold and reference data sets whose quantity is the preset quantity threshold, and then the video decoding device may construct an equation set matrix based on the encoded data blocks whose quantity is the preset quantity threshold and the reference data sets whose quantity is the preset quantity threshold. The equation set matrix may include a coefficient matrix, a solution matrix, and a constant-term matrix, and the constant-term matrix may be obtained by multiplying the coefficient matrix and the solution matrix.

Optionally, in a process of constructing the equation set matrix, the video decoding device may construct the constant-term matrix of the equation set matrix using the encoded data blocks whose quantity is the preset quantity threshold, and each encoded data block may be used as one row of the constant-term matrix. For example, the constant-term matrix of the equation set matrix constructed by the video decoding device may be $[a_1, a_2, \ldots, a_i, \ldots, a_v]^T$, where v is the preset quantity threshold.

In addition, the video decoding device may construct the coefficient matrix of the equation set matrix using the reference data sets whose quantity is the preset quantity threshold, where each reference data set may be used as one row of the coefficient matrix, and a rank of the row in which each reference data set is located in the coefficient matrix is the same as a rank of a row in which an encoded data block corresponding to the reference data set is located in the constant-term matrix. For example, the coefficient matrix of the equation set matrix constructed by the video decoding device may be:

$$\begin{bmatrix} C_{11} & C_{12} & \ldots & C_{1u} & \ldots & C_{1k} \\ C_{21} & C_{22} & \ldots & C_{2u} & \ldots & C_{2k} \\ \ldots & \ldots & \ldots & \ldots & \ldots & \ldots \\ C_{i1} & C_{i2} & \ldots & C_{iu} & \ldots & C_{ik} \\ \ldots & \ldots & \ldots & \ldots & \ldots & \ldots \\ C_{v1} & C_{v2} & \ldots & C_{vu} & \ldots & C_{vk} \end{bmatrix}.$$

A rank of a row in which a reference data set $C_{i1}$, $C_{i2}, \ldots, C_{iu}, \ldots, C_{ik}$ is located in the coefficient matrix is i, and a rank of a row in which an encoded data block $a_i$ corresponding to the reference data set $C_{i1}, C_{i2}, \ldots, C_{iu}, \ldots, C_{ik}$ is located in the constant-term matrix is also i.

Then, the video decoding device may solve the solution matrix $[x_1, x_2, \ldots, x_u, \ldots, x_k]^T$ of the equation set matrix based on a Gauss-Jordan elimination algorithm.

As described above, the solution matrix $[x_1, x_2, \ldots, x_u, \ldots, x_k]^T$ of the equation set matrix may be multiplied by the coefficient matrix to obtain the constant-term matrix. Further, $$\begin{bmatrix} C_{11} & C_{12} & \ldots & C_{1u} & \ldots & C_{1k} \\ C_{21} & C_{22} & \ldots & C_{2u} & \ldots & C_{2k} \\ \ldots & \ldots & \ldots & \ldots & \ldots & \ldots \\ C_{i1} & C_{i2} & \ldots & C_{iu} & \ldots & C_{ik} \\ \ldots & \ldots & \ldots & \ldots & \ldots & \ldots \\ C_{v1} & C_{v2} & \ldots & C_{vu} & \ldots & C_{vk} \end{bmatrix} \times \begin{bmatrix} x_1 \\ x_2 \\ \ldots \\ x_u \\ \ldots \\ x_k \end{bmatrix} = \begin{bmatrix} a_1 \\ a_2 \\ \ldots \\ a_i \\ \ldots \\ a_v \end{bmatrix}.$$

Therefore, it may be learned from the foregoing encoding process that the solution matrix $[x_1, x_2, \ldots, x_u, \ldots, x_k]^T$ of the equation set matrix is a matrix including the k data blocks included in the target video data segment, that is, $[x_1, x_2, \ldots, x_u, \ldots, x_k]^T = [b_1, b_2, \ldots, b_u, \ldots, b_k]^T$.

In actual application, because a solution of a linear equation set is unrelated to a sequence of equations in the linear equation set, the solution matrix of the equation set matrix remains unchanged provided that when the video decoding device constructs the equation set matrix, a rank of a row in which the reference data set is located in the coefficient matrix is the same as a rank of a row in which an encoded data block corresponding to the reference data set is located in the constant-term matrix regardless of a sorting manner of v reference data sets in the coefficient matrix and a sorting manner of v encoded data blocks in the constant-term matrix. $[x_1, x_2, \ldots, x_u, \ldots, x_k]^T = [b_1, b_2, \ldots, b_u, \ldots, b_k]^T$ is still met. For example, when the sorting manner of the v reference data sets in the coefficient matrix and the sorting manner of the v encoded data blocks in the constant-term matrix change as follows, the solution matrix of the equation set matrix remains unchanged and is still equal to $[b_1, b_2, \ldots, b_u, \ldots, b_k]^T$:

$$\begin{bmatrix} C_{v1} & C_{v2} & \ldots & C_{vu} & \ldots & C_{vk} \\ C_{21} & C_{22} & \ldots & C_{2u} & \ldots & C_{2k} \\ \ldots & \ldots & \ldots & \ldots & \ldots & \ldots \\ C_{i1} & C_{i2} & \ldots & C_{iu} & \ldots & C_{ik} \\ \ldots & \ldots & \ldots & \ldots & \ldots & \ldots \\ C_{11} & C_{12} & \ldots & C_{1u} & \ldots & C_{1k} \end{bmatrix} \times \begin{bmatrix} x_1 \\ x_2 \\ \ldots \\ x_u \\ \ldots \\ x_k \end{bmatrix} = \begin{bmatrix} a_v \\ a_2 \\ \ldots \\ a_i \\ \ldots \\ a_1 \end{bmatrix}.$$

It may be learned from the foregoing analysis that a sequence of receiving the v first reference data groups by the video decoding device is unrelated to a sequence of the k data blocks in the target video data segment finally obtained through decoding. In this way, out-of-order of video data streams in the to-be-transmitted live video can be avoided such that it can be ensured that the audience terminal normally plays the to-be-transmitted live video.

In addition, because a quantity of equations in the linear equation set is equal to a quantity of unknown numbers, the equation set has a unique solution. Therefore, in the equation set matrix, only when both a row rank v of the coefficient matrix and a row rank v of the constant-term matrix are equal to k, the equation set matrix has a unique determined solution matrix. That is, to ensure that the video decoding device can successfully obtain the target video data segment through decoding, a value of the preset quantity threshold v may be equal to k.

Step 309: The video decoding device sends the target video data segment obtained through decoding to the background storage server.

In a subsequent technical process, the background storage server may receive a viewing request sent by the front-end server in the CDN network. After receiving the viewing request, the background storage server may send the target video data segment to the front-end server such that the front-end server sends the target video data segment to the audience terminal.

The video decoding device sends the target video data segment to the background storage server, and then the background storage server forwards the target video data segment to the audience terminal using the front-end server such that the CDN network can support a function such as playing back the live video, thereby increasing flexibility of live video playing.

In conclusion, in the video transmission method provided in this embodiment of this application, the video coding device encodes, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of the live video to some extent. In addition, when n is greater than 1, the video coding device may send video data in an uplink process of the live video using a plurality of paths, that is, using a plurality of front-end servers. This improves utilization of uplink bandwidth of the live broadcasting network, and can avoid the freezing and the delay of the live video to some extent.

To ensure that the video decoding device can still successfully obtain the target video data segment through decoding when a packet loss occurs, the video coding device needs to set the value of t to a value greater than the preset quantity threshold (that is, k). In actual application, if the value of t is set to an excessively large value, the video coding device sends, to the video decoding device, excessive first reference data groups that do not work for decoding, thereby wasting network resources of the live broadcasting network, and if the value of t is set to an excessively small value, the video decoding device cannot receive first reference data groups whose quantity is the preset quantity threshold when a packet loss occurs, and consequently, the video decoding device cannot successfully obtain the target video data segment through decoding. Therefore, how to set t to a proper value is important in the video transmission method provided in this application. To resolve this problem, another video transmission method is provided in an embodiment of this application. The video transmission method may be applied to the live broadcasting network shown in FIG. 2A or FIG. 2B. In addition to the technical process of steps 301 to 309 in the embodiment shown in FIG. 3A, the video transmission method may further include steps 401 and 402 shown in FIG. 4. The steps 401 and 402 may be performed before step 302.

Step 401: When the target video data segment is the first video data segment obtained by the video coding device from the video data stream of the to-be-transmitted live video, the video coding device determines the value of t based on an average packet loss rate of the live broadcasting network.

As described above, the video coding device may continuously obtain a plurality of video data segments from the video data stream of the to-be-transmitted live video, and the target video data segment is one of the plurality of video data segments. When the target video data segment is the first video data segment obtained by the video coding device from the video data stream, the video coding device may first determine the value of t based on the average packet loss rate of the live broadcasting network before obtaining the t reference data sets. Optionally, in this case, the video coding device may calculate the value of t based on a second formula, and the second formula is:

$$t=\min\{(k+1),\lfloor(1+\rho)\times k\rfloor\}.$$

In the second formula, $\rho$ is the average packet loss rate of the live broadcasting network, and may be set based on an empirical value, for example, $\rho$ may be set to 0.03, $\lfloor\ \rfloor$ is a rounding down operator, and min( ) is a minimization operation.

Step 402: When the target video data segment is a $(p+1)^{th}$ (p is a positive integer greater than or equal to 1) video data segment obtained by the video coding device from the video data stream, the video coding device determines the value of t based on received p historical decoding differences.

In this embodiment of this application, for each video data segment obtained by the video coding device from the video data stream, the video decoding device may return a decoding difference to the video coding device. Before the video coding device encodes the target video data segment, a decoding difference returned by the video decoding device to the video coding device may be referred to as a historical decoding difference, and a decoding difference returned by the video decoding device to the video coding device for the target video data segment may be referred to as a current decoding difference.

It may be learned from the foregoing descriptions that, before encoding the target video data segment, the video coding device may receive the p historical decoding differences sent by the video decoding device, where an $i^{th}$ historical decoding difference in the p historical decoding differences is used to reflect a quantity of reference data groups that the video decoding device lacks before successfully obtaining the $i^{th}$ video data segment through decoding at the end of the second preset duration, and the $i^{th}$ video data segment is an $i^{th}$ video data segment in p video data segments obtained by the video coding device from the video data stream before obtaining the target video data segment.

Optionally, when the video decoding device successfully obtains the $i^{th}$ video data segment through decoding, the $i^{th}$ historical decoding difference $d_i=0$, and when the video decoding device fails to obtain the $i^{th}$ video data segment through decoding, the $i^{th}$ historical decoding difference $d_i=y-x$, where y is a quantity of reference data groups required by the video decoding device to successfully obtain the $i^{th}$ video data segment through decoding. In this embodiment of this application, y may be equal to the preset quantity threshold, that is, y may be equal to k, and x is a quantity of reference data groups obtained by the video decoding device by encoding the $i^{th}$ video data segment.

When the target video data segment is the $(p+1)^{th}$ video data segment obtained by the video coding device from the video data stream, the video coding device may first determine the value of t based on the received p historical decoding differences before obtaining the t reference data sets. Optionally, in this case, the video coding device may calculate the value of t based on a first formula, and the first formula is:

$$t = \begin{cases} \min\{(1+\alpha_p)t_p, (t_p+1)\} & F_p > 0 \\ \max\{(t_p-1), k\}, & F_p=0, F_{p-1}=0, F_{p-2}=0, \text{ and } p>2 \\ t_p & F_p=0, F_{p-1}=0, \text{ and } p>1 \\ t_p & F_p=0 \text{ and } p \geq 1 \end{cases}.$$

In the first formula, $F_i=d_i/k$ and $1 \leq i \leq p$, where $d_i$ is the $i^{th}$ historical decoding difference in the p historical decoding differences, $$\alpha_i = \begin{cases} (1-g) \times \alpha_{i-1} + g \times F_i & 1 < i \leq p \\ 0 & i=1 \end{cases},$$

g is weight parameter, $0 \leq g \leq 1$, g may usually be 0.1 or 0.2, and $t_p$ is a quantity of reference data sets obtained by the video coding device before encoding a $p^{th}$ video data segment in the video data stream.

In conclusion, in the video transmission method provided in this embodiment of this application, the video coding device encodes, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of the live video to some extent. In addition, when n is greater than 1, the video coding device may send video data in an uplink process of the live video using a plurality of paths, that is, using a plurality of front-end servers. This improves utilization of uplink bandwidth of the live broadcasting network, and can avoid the freezing and the delay of the live video to some extent.

Further, before obtaining the t reference data sets, the video coding device determines the value of t based on the first formula or the second formula such that it can be ensured that the video coding device sets a proper value for t, thereby avoiding a waste of network resources of the live broadcasting network and avoiding a case in which the video decoding device cannot successfully obtain the target video data segment through decoding.

In actual application, the quantity k of data blocks included in the video data segment is related to an uplink delay of the video data segment, where the uplink delay is a transmission delay obtained when the video data segment is sent from the anchor terminal to the video decoding device. Therefore, in this embodiment of this application, a proper value may be set for k such that the uplink delay falls within a preset transmission delay range. To implement the foregoing technical process, an embodiment of this application provides another video transmission method. The video transmission method may be applied to the live broadcasting network shown in FIG. 2A or FIG. 2B. In addition to the technical process of steps 301 to 309 in the embodiment shown in FIG. 3A, the video transmission method may further include step 501 shown in FIG. 5A. Step 501 may be performed before step 301.

Step 501: The video coding device determines a value of k.

In this embodiment of this application, the video coding device may receive a configuration instruction sent by another device, where the configuration instruction may indicate the value of k, and the value of k indicated by the configuration instruction can enable a transmission delay to be within a preset transmission delay range, or the video coding device may determine the value of k based on a preset correspondence between a transmission delay and the quantity k of data blocks such that a transmission delay corresponding to k falls within a preset transmission delay range. It should be noted that the "transmission delay" is the uplink delay of the video data segment. That is, the "transmission delay" is the transmission delay obtained when the video data segment is sent from the anchor terminal to the video decoding device.

The following describes a technical process in which the video coding device determines the value of k based on the preset correspondence between a transmission delay and the quantity k of data blocks in this embodiment of this application.

In actual application, the transmission delay may usually include duration required by the anchor terminal to generate one video data segment, duration required by the video coding device to encode the video data segment, duration required by the video coding device to send the encoded video data segment to n front-end servers, duration required by the n front-end servers to send the encoded video data segment to the video decoding device, and duration required by the video decoding device to decode the video data segment.

It should be noted that when the video coding device is a video coding server, the transmission delay may further include duration required by the anchor terminal to send the video data segment to the video coding server. However, because the video coding server may be usually disposed at a location, such as a base station, that is relatively close to the anchor terminal geographically, the duration required by the anchor terminal to send the video data segment to the video coding server may be ignored.

The duration generate_time required by the anchor terminal to generate one video data segment is usually equal to play duration play_time of the video data segment, and the play duration of the video data segment is duration in which the audience terminal can play the to-be-transmitted live video based on one video data segment. The play duration of the video data segment may be calculated using the seventh formula, and the seventh formula is:

$$\text{play\_time} = \frac{k \times B}{\text{bit\_rate}}.$$

B is a data volume size of the data block, and bit_rate is a video play bit rate of the to-be-transmitted live video.

The duration required by the video coding device to encode the video data segment is equal to the duration required by the video decoding device to decode the video data segment, and both are $T_{coding}$:

$$T_{coding} = T_0 \times \left(\frac{k}{k_0}\right)^2 \times \frac{B}{B_0}.$$

$T_0$ is duration required by the video coding device to encode or the video decoding device to decode a video data segment including $k_0$ data blocks whose data volume sizes are $B_0$. It is found through measurement that when $k_0=10$ and $B_0=1$ KB, $T_0=0.1$ ms, and therefore $T_{coding}$ may be alternatively:

$$T_{coding} = 0.1 \times \left(\frac{k}{10}\right)^2 \times B.$$

The duration trans_time$_1$ required by the video coding device to send the encoded video data segment to the n front-end servers is:

$$\text{trans\_time}_1 = t \times B \times \frac{1}{(1 + e^{\beta \times (\rho_{min} - \rho)}) \times \sum_{w=1}^{n} \frac{thr_w}{1 + e^{\beta \times (\rho_w - \rho)}}},$$

where e is a base number of a natural logarithm, t is a quantity of reference data sets obtained by the video coding device, $\beta$ is a constant, $\rho_{min}$ is a minimum value of a packet loss rate between the video coding device and each of the n front-end servers, $\rho$ is an average packet loss rate of the live broadcasting network and may be set based on an empirical value, for example, $\rho$ may be set to 0.03, $thr_w$ is a data transmission rate between the video coding device and a $w^{th}$ front-end server in the n front-end servers, and $\rho_w$ is a packet loss rate between the video coding device and the $w^{th}$ front-end server in the n front-end servers.

The duration trans_time$_2$ required by the n front-end servers to send the encoded video data segment to the video decoding device is:

$$\text{trans\_time}_2 = \max[\tfrac{1}{2} \times RTT_v \times (1 - \text{loss \%}_v) + RTO \times \text{loss \%}_v],$$

where $RTT_w$ is round-trip duration of a data packet between a $v^{th}$ front-end server in the n front-end servers and the video decoding device, loss %$_v$ is a packet loss rate between the $v^{th}$ front-end server in the n front-end servers and the video decoding device, RTO is a retransmission timeout, and max ( ) indicates a maximization operation.

It may be learned from the foregoing analysis that the correspondence between a transmission delay and the quantity k of data blocks may be:

$$\text{delay} = \frac{k \times B}{\text{bit\_rate}} + 2 \times T_0 \times \left(\frac{k}{k_0}\right)^2 \times \frac{B}{B_0} +$$

$$t \times B \times \frac{1}{(1 + e^{\beta \times (\rho_{min} - \rho)}) \times \sum_{w=1}^{n} \frac{thr_w}{1 + e^{\beta \times (\rho_w - \rho)}}} +$$

$$\max\left[\frac{1}{2} \times RTT_v \times (1 - \text{loss \%}_v) + RTO \times \text{loss \%}_v\right] + \Delta,$$

where delay is the transmission delay, $\Delta$ is an error delay and is an error delay caused due to a reason such as link pause, and generally, a value of $\Delta$ may be obtained based on an empirical value.

FIG. 5B is an example schematic diagram of a correspondence between a transmission delay and the quantity k of data blocks. As shown in FIG. 5B, when it needs to be ensured that the transmission delay is less than 100 milliseconds (ms), a value of k may be set to 30.

In conclusion, in the video transmission method provided in this embodiment of this application, the video coding device encodes, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of the live video to some extent. In addition, when n is greater than 1, the video coding device may send video data in an uplink process of the live video using a plurality of paths, that is, using a plurality of front-end servers. This improves utilization of uplink bandwidth of the live broadcasting network, and can avoid the freezing and the delay of the live video to some extent.

Further, a proper value is set for k such that an uplink delay of the video data segment can be within the preset transmission delay range, thereby ensuring an uplink rate of the video data segment, and avoiding a phenomenon that freezing occurs very frequently or a delay is very long when the audience terminal plays the to-be-transmitted live video.

The following is an apparatus embodiment of this application, and the apparatus embodiment may be used to execute the method embodiments of this application. For details not disclosed in the apparatus embodiment of this application, refer to the method embodiments of this application.

FIG. 6 is a block diagram of a video transmission apparatus 600 according to an embodiment of this application. The video transmission apparatus 600 may be a video coding device. Referring to FIG. 6, the video transmission apparatus 600 may include a first obtaining module 601, a second obtaining module 602, an encoding module 603, and a sending module 604.

The first obtaining module 601 is configured to obtain a target video data segment, where the target video data segment is a segment of data in a video data stream of a to-be-transmitted live video, the target video data segment includes k data blocks, and k is a positive integer greater than or equal to 1.

The second obtaining module 602 is configured to obtain t reference data sets, where each reference data set includes at least one piece of reference data, and t is a positive integer greater than k.

The encoding module 603 is configured to encode the target video data segment using each reference data set, to obtain t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment.

The sending module 604 is configured to send t first reference data groups to a video decoding device using n front-end servers, where n is a positive integer greater than or equal to 1.

Each first reference data group includes one encoded data block and a corresponding reference data set.

Optionally, each reference data set includes k pieces of reference data that are in a one-to-one correspondence with the k data blocks, and the encoding module 603 is configured to for each reference data set, multiply each piece of reference data included in the reference data set by a corresponding data block to obtain k products, and add the k products to obtain an encoded data block corresponding to the reference data set.

Optionally, the first obtaining module 601 is configured to obtain the video data stream of the to-be-transmitted live video, obtain a data block from the video data stream, and in first preset duration, when a quantity of obtained data blocks is not less than k, form the target video data segment using the obtained k data blocks, or when the quantity of obtained data blocks is less than k at the end of the first preset duration, pad the obtained data blocks using preset data, to obtain k data blocks, and form the target video data segment using the k data blocks obtained through padding.

An embodiment of this application further provides another video transmission apparatus 700. In addition to the modules included in the video transmission apparatus 600, the video transmission apparatus 700 further includes a first determining module 605, a second determining module 606, a third determining module 607, and a fourth determining module 608.

The first determining module 605 is configured to receive p historical decoding differences sent by the video decoding device, where the p historical decoding differences are in a one-to-one correspondence with p video data segments preceding the target video data segment in the video data stream, and each historical decoding difference is used to reflect a quantity of reference data groups that the video decoding device lacks at the end of second preset duration before successfully obtaining corresponding video data segments through decoding, and determine, based on the p historical decoding differences, a value of the quantity t of reference data sets that need to be obtained.

An $i^{th}$ historical decoding difference $d_i$ in the p historical decoding differences meets, when the video decoding device successfully obtains, in the second preset duration through decoding, an $i^{th}$ video data segment that is in the video data stream and that corresponds to the $i^{th}$ historical decoding difference, $d_i=0$, and when the video decoding device fails to obtain the $i^{th}$ video data segment through decoding at the end of the second preset duration, $d_i=y-x$, where y is a quantity of reference data groups required by the video decoding device to successfully obtain the $i^{th}$ video data segment through decoding, x is a quantity of reference data groups corresponding to the $i^{th}$ video data segment that are obtained by the video decoding device at the end of the second preset duration, and $1 \le i \le p$.

The first determining module 605 is configured to calculate, based on the p historical decoding differences and a first formula, the value of the quantity t of reference data sets that need to be obtained, where the first formula is:

$$t = \begin{cases} \min\{(1+\alpha_p)t_p,\ (t_p+1)\} & F_p > 0 \\ \max\{(t_p-1),\ k\}, & F_p=0,\ F_{p-1}=0,\ F_{p-2}=0,\ \text{and}\ p>2 \\ t_p & F_p=0,\ F_{p-1}=0,\ \text{and}\ p>1 \\ t_p & F_p=0\ \text{and}\ p\ge 1 \end{cases},$$

where $F_i = d_i/k$ and $$\alpha_i = \begin{cases} (1-g) \times \alpha_{i-1} + g \times F_i & 1 < i \leq p \\ 0 & i = 1 \end{cases},$$

where g is weight parameter, $d_i$ is the $i^{th}$ historical decoding difference in the p historical decoding differences, $t_p$ is a quantity of reference data sets obtained by the video coding device before encoding a $p^{th}$ video data segment in the video data stream.

The target video data segment is the first video data segment obtained by the video coding device from the video data stream, and the second determining module 606 is configured to determine, based on an average packet loss rate of a live broadcasting network, a value of the quantity t of reference data sets that need to be obtained.

The second determining module 606 is configured to calculate, based on the average packet loss rate of the live broadcasting network and a second formula, the value of the quantity t of reference data sets that need to be obtained, where the second formula is:

$t = \min\{(k+1), \lfloor (1+\rho) \times k \rfloor\}$, where $\rho$ is the average packet loss rate of the live broadcasting network, and $\lfloor \ \rfloor$ is a rounding down operator.

The third determining module 607 is configured to determine r front-end servers that have established communication connections to the video coding device, where r is a positive integer greater than or equal to n, and determine the n front-end servers from the r front-end servers based on a data transmission rate between the video coding device and each of the r front-end servers, where communication quality between the n front-end servers and the video coding device is better than communication quality between another front-end server and the video coding device.

The third determining module 607 is configured to calculate a utility value of each front-end server based on a third formula and the data transmission rate between the video coding device and each of the r front-end servers, where the third formula is:

$$u_j = \frac{thr_j}{1 + e^{\beta \times (\rho_j - \rho)}},$$

where $u_j$ is a utility value of a $j^{th}$ front-end server in the r front-end servers, $1 \leq j \leq r$, $thr_j$ is a data transmission rate between the video coding device and the $j^{th}$ front-end server, $\rho_j$ is a packet loss rate between the video coding device and the $j^{th}$ front-end server, $\rho$ is an average packet loss rate of the live broadcasting network, and $\beta$ is a constant, and determine the n front-end servers from the r front-end servers in descending order of utility values.

The sending module 604 is configured to determine, based on a fourth formula, a quantity of first reference data groups corresponding to each of the n front-end servers, where the fourth formula is:

$$y_l = \frac{t \times u_l}{\sum_{w=1}^{n} u_w},$$

where $y_l$ is a quantity of first reference data groups corresponding to the first front-end server in the n front-end servers, $u_l$ is a utility value of the first front-end server, $\sum_{w=1}^{n} u_w$ is a sum of utility values of the n front-end servers, and $1 \leq l \leq n$, and send a corresponding quantity of first reference data groups to each front-end server such that the front-end server sends the received first reference data groups to the video decoding device.

The fourth determining module 608 is configured to determine the quantity k of data blocks in the target video segment based on a preset correspondence between a transmission delay and a quantity of data blocks such that a transmission delay corresponding to the quantity k of data blocks falls within a preset transmission delay range, where the transmission delay is a transmission delay existing when an anchor terminal sends the video data segment to the video decoding device.

In conclusion, the video transmission apparatus provided in this embodiment of this application encodes, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of the live video to some extent. In addition, when n is greater than 1, the video coding device may send video data in an uplink process of the live video using a plurality of paths, that is, using a plurality of front-end servers. This improves utilization of uplink bandwidth of the live broadcasting network, and can avoid the freezing and the delay of the live video to some extent.

FIG. 8 is a block diagram of a video transmission apparatus 800 according to an embodiment of this application. The video transmission apparatus 800 may be a video decoding device. Referring to FIG. 8, the video transmission apparatus 800 may include a receiving module 801, a construction module 802, and a determining module 803.

The receiving module 801 is configured to receive first reference data groups sent by u front-end servers, where each first reference data group includes an encoded data block and a corresponding reference data set, each encoded data block is obtained by a video coding device by encoding a target video data segment using a corresponding reference data set, the target video data segment is a segment of data in a video data stream of a live video, the target video data segment includes k data blocks, the reference data set includes at least one piece of reference data, k is a positive integer greater than or equal to 1, and u is a positive integer greater than or equal to 1.

The construction module 802 is configured to in second preset duration, when a quantity of received first reference data groups reaches k, construct an equation set matrix based on encoded data blocks and reference data sets in the received k first reference data groups.

The determining module 803 is configured to determine data of a calculated solution matrix of the equation set matrix as data of the target video data segment.

Optionally, the construction module 802 is configured to parse the received k first reference data groups to obtain k encoded data blocks and k reference data sets that are in a one-to-one correspondence with the k encoded data blocks, construct a constant-term matrix of the equation set matrix using the k encoded data blocks, where each encoded data block is used as one row of the constant-term matrix, and construct a coefficient matrix of the equation set matrix using the k reference data sets, where each reference data set is used as one row of the coefficient matrix, and a rank of the row in which each reference data set is located in the coefficient matrix is the same as a rank of a row in which a corresponding encoded data block is located in the constant-term matrix.

An embodiment of this application further provides another video transmission apparatus 900. In addition to the modules included in the video transmission apparatus 800, the video transmission apparatus 900 further includes a first sending module 804, a second sending module 805, and a storage module 806.

The first sending module 804 is configured to when the quantity of received first reference data groups is less than k at the end of the second preset duration, obtain an absolute value of a difference between the quantity of received first reference data groups and k, and send the absolute value to the video coding device as a current decoding difference.

The second sending module 805 is configured to in the second preset duration, after the quantity of received first reference data groups reaches k, send a current decoding difference to the video coding device, where the current decoding difference is 0.

The storage module 806 is configured to store the first reference data groups in preset storage locations, where a storage space size of the preset storage location is determined based on maximum delay duration, minimum delay duration, and generation duration of a video data segment in the video data stream, where the maximum delay duration is maximum duration required by the video coding device to send the reference data group to the video decoding device through the front-end server, and the minimum delay duration is minimum duration required by the video coding device to send the reference data group to the video decoding device through the front-end server.

The storage space size of the preset storage location meets a sixth formula, and the sixth formula is:

$$Q = \frac{\max(\text{delay}) - \min(\text{delay})}{\text{generate\_time}} \times s,$$

where Q is the storage space size of the preset storage location, max(delay) is the maximum delay duration, min(delay) is the minimum delay duration, generate_time is the generation duration of the video data segment in the video data stream, and s is a data volume size of the video data segment.

In conclusion, the video transmission apparatus provided in this embodiment of this application encodes, separately using the t reference data sets, the target video data segment including the k data blocks, to obtain the t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment. Then, the video coding device may send the t first reference data groups to the video decoding device using the n front-end servers, where each first reference data group includes one encoded data block and an encoded data set corresponding to the encoded data block, that is, each first reference data group is one equation in an equation set corresponding to the equation set matrix. In this way, after receiving any k first reference data groups in the t first reference data groups, that is, after receiving any k equations, the video decoding device may construct an equation set matrix, and solve a solution matrix of the equation set matrix to obtain the target video data segment through decoding. In this way, even if a packet loss occurs, the video coding device still has a relatively large probability of receiving k reference data groups in the t first reference data groups. Therefore, a probability that the video coding device needs to retransmit data when the packet loss occurs can be reduced, thereby avoiding freezing and a delay of the live video to some extent. In addition, when n is greater than 1, the video coding device may send video data in an uplink process of the live video using a plurality of paths, that is, using a plurality of front-end servers. This improves utilization of uplink bandwidth of a live broadcasting network, and can avoid the freezing and the delay of the live video to some extent.

An embodiment provides a terminal 1000, and the terminal may be configured to perform the video coding method provided in the foregoing embodiments. As shown in FIG. 10, the terminal 1000 includes the following.

The terminal 1000 may include parts such as a radio frequency (RF) circuit 1010, a memory 1020 that includes one or more computer readable storage media, an input unit 1030, a display unit 1040, a sensor 1050, an audio circuit 1060, a WI-FI module 1070, a processor 1080 including one or more processing cores, and a power supply 190. A person skilled in the art may understand that the terminal structure shown in FIG. 10 constitutes no limitation on the terminal, and may include more or fewer parts than those shown in the figure, or combine some parts, or have different part arrangements.

The RF circuit 1010 may be configured to receive and send a signal in an information receiving or sending process or a call process, and in particular, after receiving downlink information of a base station, send the downlink information to one or more processor 1080 for processing, and in addition, send related uplink data to the base station. Generally, the RF circuit 1010 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 1010 may communicate with a network and another device through wireless communication. Any communications standard or protocol may be used for the wireless communication, including but not limited to Global System for Mobile Communications (GSM), General Packet Radio Service (GPRS), code-division multiple access (CDMA), wideband CDMA (WCDMA), Long-Term Evolution (LTE), an email, short message service (SMS), and the like.

The memory 1020 may be configured to store a software program and a module, and the processor 1080 executes various functional applications and processes data by running the software program and the module that are stored in the memory 1020. The memory 1020 may mainly include a program storage area and a data storage area, where the program storage area may store an operating system, an application program that is required by at least one function (such as a sound playing function or an image playing function), and the like, and the data storage area may store data (such as audio data or an address book) that is created based on use of the terminal 1000, and the like. In addition, the memory 1020 may include a high-speed random access memory (RAM), and may further include a nonvolatile memory, such as at least one magnetic disk storage component, a flash memory component, or a solid-state storage component. Correspondingly, the memory 1020 may further include a memory controller, to provide the processor 1080 and the input unit 1030 with access to the memory 1020.

The input unit 1030 may be configured to receive input digital or character information, and produce signal input that is of a keyboard, a mouse, a joystick, optics, or a trackball and that is related to user setting and functional control. Further, the input unit 1030 may include a touch-sensitive surface 1031 and another input device 1032. The touch-sensitive surface 1031, also referred to as a touchscreen or a touchpad, may collect a touch operation (such as an operation that a user performs on the touch-sensitive surface 1031 or near the touch-sensitive surface 1031 using a finger, a stylus, or any other suitable object or accessory) of the user on or near the touch-sensitive surface, and drive a corresponding connection apparatus based on a preset formula. Optionally, the touch-sensitive surface 1031 may include two parts a touch detection apparatus and a touch controller. The touch detection apparatus detects a touch position of the user, detects a signal brought by a touch operation, and sends the signal to the touch controller. The touch controller receives touch information from the touch detection apparatus, converts the touch information into touch point coordinates, sends the touch point coordinates to the processor 1080, and can receive and execute a command sent by the processor 1080. In addition, the touch-sensitive surface 1031 may be implemented by a resistive, capacitive, infrared, or surface acoustic touch-sensitive surface. In addition to the touch-sensitive surface 1031, the input unit 1030 may further include an input device 1032. Further, the input device 1032 may include but is not limited to one or more of a physical keyboard, a function key (such as a volume control key or an on/off key), a trackball, a mouse, a joystick, and the like.

The display unit 1040 may be configured to display information input by the user or information provided to the user, and various graphic user interfaces of the terminal 1000, and the graphic user interfaces may include a graphic, a text, an icon, a video, and any combination thereof. The display unit 1040 may include a display panel 1041. Optionally, the display panel 1041 may be configured using liquid-crystal display (LCD), an organic light-emitting diode (OLED), or the like. Further, the touch-sensitive surface 1031 may cover the display panel 1041. When detecting the touch operation on or near the touch-sensitive surface 1031, the touch-sensitive surface 1041 transmits the touch operation to the processor 1080 to determine a type of a touch event, and then the processor 1080 provides corresponding visual output on the display panel 1041 based on the type of the touch event. Although the touch-sensitive surface 1031 and the display panel 1041 are used as two independent components to implement input and input functions in FIG. 10, in some embodiments, the touch-sensitive surface 1031 may be integrated with the display panel 1041 to implement the input and output functions.

The terminal 1000 may further include at least one type of sensor 1050, such as a light sensor, a motion sensor, and another sensor. Further, the light sensor may include an ambient light sensor and a proximity sensor. The ambient light sensor may adjust luminance of the display panel 1041 based on brightness of an ambient light. The proximity sensor may turn off the display panel 1041 and/or backlight when the terminal 1000 moves to an ear. As one type of a motion sensor, a gravity acceleration sensor can detect a value of an acceleration in each direction (generally, three axes), can detect a value and a direction of gravity in a static mode, and can be used for an application for identifying a mobile phone gesture (such as landscape/portrait orientation switching, related games, and magnetometer gesture calibration), a function related to vibration identification (such as a pedometer and a stroke), and the like. For other sensors such as a gyroscope, a barometer, a hygrometer, a thermometer, and an infrared sensor that can be further configured on the terminal 1000, details are not described herein.

The audio circuit 1060, a loudspeaker 1061, and a microphone 1062 can provide an audio interface between the user and the terminal 1000. The audio circuit 1060 may transmit, to the loudspeaker 1061, an electrical signal converted from received audio data, and the loudspeaker 1061 converts the electrical signal into a sound signal for output. In addition, the microphone 1062 converts a collected sound signal into an electrical signal, the audio circuit 1060 converts the electrical signal into audio data after receiving the electrical signal and outputs the audio data to the processor 1080 for processing, and then the audio data is sent to, for example, another terminal using the RF circuit 1010, or the audio data is output to the memory 1020 for further processing. The audio circuit 1060 may probably include an earplug jack, to provide an external earphone for communicating with the terminal 1000.

WI-FI is a short-distance radio transmission technology. The terminal 1000 uses the WI-FI module 1070 to help the user receive and send an email, browse a web page, gain access to streaming media, and the like. The WI-FI module 1070 provides the user with wireless broadband Internet access. Although the WI-FI module 1070 is shown in FIG. 10, it may be understood that the WI-FI module 1070 is not a mandatory component of the terminal 1000, and may be omitted based on a requirement provided that the essence of the present disclosure is not changed.

The processor 1080 may be a control center of the terminal 1000. Various interfaces and cables are used to connect to various parts of an entire mobile phone. The processor 1080 executes various functions of the terminal 1000 and processes data by running or executing the software program and/or module stored in the memory 1020 and by invoking data stored in the memory 1020, to perform overall monitoring on the mobile phone. Optionally, the processor 1080 may include the one or more processing cores. The processor 1080 may integrate an application processor and a modem processor. The application processor mainly processes an operating system, a user interface, an application program, and the like, and the modem processor mainly processes wireless communication. It may be understood that the modem processor may not be integrated into the processor 1080.

The terminal 1000 further includes the power supply 1090 (such as a battery) that supplies power to the parts. The power supply 1090 may be logically connected to the processor 1080 using a power management system such that functions such as charging and discharging management and power consumption management are implemented using the power management system. The power supply 1090 may further include any components such as one or more direct current or alternating current power supplies, a recharging system, a power failure detection circuit, a power converter or an inverter, and a power status indicator.

Although not shown, the terminal 1000 may further include a camera, a BLUETOOTH module, and the like, and details are not described herein. Further, in this embodiment, the display unit of the terminal may be a touchscreen display, and the terminal further includes a memory and one or more programs, where the one or more programs are stored in the memory and are executed by one or more processors after being configured. The one or more programs includes instructions used for performing the following operations obtaining a target video data segment, where the target video data segment is a segment of data in a video data stream of a to-be-transmitted live video, the target video data segment includes k data blocks, and k is a positive integer greater than or equal to 1, obtaining t reference data sets, where each reference data set includes at least one piece of reference data, and t is a positive integer greater than k, encoding the target video data segment using each reference data set, to obtain t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment, and sending t first reference data groups to the video decoding device using n front-end servers, where n is a positive integer greater than or equal to 1, and each first reference data group includes one encoded data block and a corresponding reference data set.

FIG. 11 is a block diagram of a video transmission apparatus 1100 according to an example embodiment. For example, the apparatus 1100 may be provided as a server. As shown in FIG. 11, the apparatus 1100 includes a processing component 1122, and the processing component 1122 further includes one or more processors and a memory resource represented by a memory 1132, and is configured to store an instruction, such as an application program, that can be executed by the processing component 1122. An application program stored in the memory 1132 may include one or more modules, where each module corresponds to a group of instructions. In addition, the processing component 1122 is configured to execute the instruction to perform the following method obtaining a target video data segment, where the target video data segment is a segment of data in a video data stream of a to-be-transmitted live video, the target video data segment includes k data blocks, and k is a positive integer greater than or equal to 1, obtaining t reference data sets, where each reference data set includes at least one piece of reference data, and t is a positive integer greater than k, encoding the target video data segment using each reference data set, to obtain t encoded data blocks that are in a one-to-one correspondence with the t reference data sets, where any k reference data sets in the t reference data sets and k encoded data blocks that are in a one-to-one correspondence with the any k reference data sets can construct an equation set matrix, and data of a solution matrix of the equation set matrix is data of the target video data segment, and sending t first reference data groups to the video decoding device using n front-end servers, where n is a positive integer greater than or equal to 1, and each first reference data group includes one encoded data block and a corresponding reference data set.

Alternatively, the following method is performed receiving first reference data groups sent by u front-end servers, where each first reference data group includes an encoded data block and a corresponding reference data set, each encoded data block is obtained by the video coding device by encoding a target video data segment using a corresponding reference data set, the target video data segment is a segment of data in a video data stream of a live video, the target video data segment includes k data blocks, the reference data set includes at least one piece of reference data, k is a positive integer greater than or equal to 1, and u is a positive integer greater than or equal to 1, in second preset duration, when a quantity of received first reference data groups reaches k, constructing an equation set matrix based on encoded data blocks and reference data sets in the received k first reference data groups, and determining data of a calculated solution matrix of the equation set matrix as data of the target video data segment.

The apparatus 1100 may further include a power supply component 1126 configured to execute power management of the apparatus 1100, a wired or wireless network interface 1150 configured to connect the apparatus 1100 to a network, and an input/output (I/O) interface 1158. The apparatus 1100 may operate an operating system stored on the memory 1132, such as Windows Server™, Mac OS X™, Unix™, Linux™, FreeBSD™, or the like.

An embodiment of this application further provides a computer readable storage medium. The computer readable storage medium may be a non-volatile computer readable storage medium. The computer readable storage medium stores an instruction. When the instruction runs on a processing component of a computer, the processing component is enabled to perform the video transmission method provided in the embodiment shown in FIG. 3A.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A video transmission method implemented by a video coding device in a live broadcasting network, wherein the live broadcasting network comprises the video coding device, a video decoding device, and a plurality of front-end servers, and wherein the video transmission method comprises:

obtaining a target video data segment from a video data stream of a to-be-transmitted live video, wherein the target video data segment comprises k data blocks, and wherein k is a positive integer greater than or equal to one;

obtaining t reference data sets, wherein each of the t reference data sets comprises a piece of reference data, and wherein t is a positive integer greater than k;

encoding the target video data segment using each of the t reference data sets to obtain t encoded data blocks that are in a one-to-one correspondence with the t reference data sets, wherein reference data sets in the t reference data sets and k encoded data blocks that are in a one-to-one correspondence with the k reference data sets form an equation set matrix, and wherein data of a solution matrix of the equation set matrix comprises data of the target video data segment; and sending t first reference data groups to the video decoding device using n front-end servers, wherein n is a positive integer greater than or equal to one wherein each of the t first reference data groups comprises one encoded data block and a corresponding reference data set.

2. The video transmission method of claim 1, wherein each of the t reference data sets comprises k pieces of reference data that are in a one-to-one correspondence with the k data blocks, and wherein the video transmission method further comprises:

multifplying for each of the t reference data sets, each piece of reference data comprised in a reference data set by a corresponding data block to obtain k products; and adding the k products to obtain an encoded data block corresponding to the reference data set.

3. The video transmission method of claim 1, further comprising:

obtaining the video data stream;

obtaining data blocks from the video data stream;

forming, during a first preset duration, the target video data segment using the k data blocks when a quantity of the data blocks is greater than or equal to k; and when the quantity of the data blocks is less than k at end of the first preset duration;

padding the data blocks using preset data to obtain the k data blocks; and forming the target video data segment using the k data blocks obtained through padding.

4. The video transmission method of claim 1, further comprising obtaining a $(p+1)^{th}$ video data segment from the video data stream as the target video data segment, wherein p is a positive integer greater than or equal to one, and wherein before obtaining the t reference data sets, the video transmission method further comprises:

receiving p historical decoding differences from the video decoding device, wherein the p historical decoding differences are in a one-to-one correspondence with p video data segments preceding the target video data segment in the video data stream, and wherein each of the p historical decoding differences reflects a quantity of reference data groups that the video decoding device lacks at an end of a second preset duration before successfully obtaining corresponding video data segments through decoding; and determining, based on the p historical decoding differences, a value of a quantity t of reference data sets that need to be obtained.

5. The video transmission method of claim 4, wherein an $i^{th}$ historical decoding difference in the p historical decoding differences ($d_i$) meets a first condition and a second condition, wherein the first condition is that $d_i$=zero when the video decoding device obtains, during the second preset duration through decoding, an $i^{th}$ video data segment that is in the video data stream and that corresponds to the $i^{th}$ historical decoding difference, and wherein the second condition is that $d_i$=y−x when the video decoding device fails to obtain the $i^{th}$ video data segment through decoding at the end of the second preset duration, wherein y is a quantity of reference data groups employed by the video decoding device to obtain the $i^{th}$ video data segment through decoding, wherein x is a quantity of reference data groups corresponding to the $i^{th}$ video data segment that are obtained by the video decoding device at the end of the second preset duration, and wherein 1≤i≤p.

6. The video transmission method of claim 4, further comprising calculating, based on the p historical decoding differences and a first formula, the value of the quantity t of reference data sets that need to be obtained, wherein the first formula is:

$$t = \begin{cases} \min\{(1+\alpha_p)t_p, (t_p+1)\} & F_p > 0 \\ \max\{(t_p-1), k\}, & F_p = 0, F_{p-1} = 0, F_{p-2} = 0, \text{ and } p > 2 \\ t_p & F_p = 0, F_{p-1} = 0, \text{ and } p > 1 \\ t_p & F_p = 0 \text{ and } p \geq 1 \end{cases},$$

wherein $F_i$=$d_i$/k and $$\alpha_i = \begin{cases} (1-g) \times \alpha_{i-1} + g \times F_i & 1 < i \leq p \\ 0 & i = 1 \end{cases},$$

wherein g is weight parameter, wherein $d_i$ is an $i^{th}$ historical decoding difference in the p historical decoding differences, wherein $t_p$ is a quantity of reference data sets obtained by the video coding device before encoding a $p^{th}$ video data segment in the video data stream.

7. The video transmission method of claim 1, further comprising obtaining a first video data segment from the video data stream as the target video data segment, and wherein before obtaining the t reference data sets, the video transmission method further comprise determining based on an average packet loss rate of the live broadcasting network, a value of a quantity t of reference data sets that need to be obtained.

8. The video transmission method of claim 7, further comprising calculating, based on the average packet loss rate and a second formula, the value of the quantity t of reference data sets that need to be obtained, wherein the second formula is:

$$t = \min\{(k+1), \lfloor(1+\rho) \times k\rfloor\},$$

wherein ρ is the average packet loss rate, and wherein ⌊ ⌋ is a rounding down operator.

9. The video transmission method of claim 1, wherein before sending the t first reference data groups to the video decoding device, the video transmission method further comprises:

determining r front-end servers that have established communication couplings to the video coding device, wherein r is a positive integer greater than or equal to n; and determining the n front-end servers from the r front-end servers based on a first data transmission rate between the video coding device and each of the r front-end servers, wherein communication quality between the n front-end servers and the video coding device is better than communication quality between another front-end server and the video coding device.

10. The video transmission method of claim 9, further comprises:
calculating a utility value of each of the r front-end servers based on a third formula and the first data transmission rate, wherein the third formula is:

$$u_j = \frac{thr_j}{1 + e^{\beta \times (\rho_j - \rho)}},$$

wherein $u_j$ is a utility value of a $j^{th}$ front-end server in the r front-end servers, wherein $1 \leq j \leq r$, wherein $thr_j$ is a second data transmission rate between the video coding device and the $j^{th}$ front-end server, wherein $\rho_j$ is a packet loss rate between the video coding device and the $j^{th}$ front-end server, wherein $\rho$ is an average packet loss rate of the live broadcasting network, and wherein $\beta$ is a constant; and
determining the n front-end servers from the r front-end servers in descending order of utility values.

11. The video transmission method of claim 10, further comprising:
determining, based on a fourth formula, a quantity of first reference data groups corresponding to each of the n front-end servers, wherein the fourth formula is:

$$y_l = \frac{t \times u_l}{\sum_{w=1}^{n} u_w},$$

wherein $y_l$ is a quantity of first reference data groups corresponding to the first front-end server in the n front-end servers, wherein $u_l$ is a utility value of the first front-end server, wherein $\Sigma_{w=1}^{n} u_w$ is a sum of utility values of the n front-end servers, and wherein $1 \leq l \leq n$; and
sending a corresponding quantity of first reference data groups to each of the n front-end servers to forward to the video decoding device.

12. The video transmission method of claim 1, wherein before obtaining the target video data segment, the video transmission method further comprises determining the k data blocks in the target video segment based on a preset correspondence between a transmission delay that exists when an ancho terminal sends the video data segment to the video decoding device a quantity of data blocks, and wherein a transmission delay corresponding to the k data blocks falls within a preset transmission delay range.

13. A video transmission method implemented by a video decoding device in a live broadcasting network, wherein the live broadcasting network comprises a video coding device, the video decoding device, and a plurality of front-end servers, and wherein the video transmission method comprises:
receiving first reference data groups from u front-end servers, wherein each of the first reference data groups comprises an encoded data block and a corresponding reference data set, wherein the encoded data block is based on encoding a target video data segment in a video data stream of alive video using a corresponding reference data set, wherein the target video data segment comprises k data blocks, wherein the reference data set comprises a piece of reference data, wherein k is a positive integer greater than or equal to one, and wherein u is a positive integer greater than or equal to one;
constructing, during a first preset duration, an equation set matrix based on encoded data blocks and reference data sets in k first reference data groups when a quantity of received first reference data groups reaches k; and
determining data of a calculated solution matrix of the equation set matrix as data of the target video data segment.

14. The video transmission method of claim 13, further comprising:
identifying that the quantity of received first reference data groups is less than k at an end of the first preset duration,
obtaining, in response to the identifying, an absolute value of a difference between the quantity of received first reference data groups and k; and
sending the absolute value to the video coding device as a current decoding difference.

15. The video transmission method of claim 13, further comprising sending, during, the first preset duration, a current decoding difference to the video coding device after the quantity of received first reference data groups reaches k, wherein the current decoding difference is zero.

16. The video transmission method of claim 13, further comprising:
parsing the received first reference data groups to obtain k encoded data blocks and k reference data sets that are in a one-to-one correspondence with the k encoded data blocks;
constructing a constant-term matrix of the equation set matrix using the k encoded data blocks, wherein each of the k encoded data blocks is a row of the constant-term matrix; and
constructing a coefficient matrix of the equation set matrix using the k reference data sets, wherein each of the k reference data sets is a row of the coefficient matrix, and wherein a rank of the row in which each of the k reference data sets is located in the coefficient matrix is the same as a rank of a row in which a corresponding encoded data block is located in the constant-term matrix.

17. The video transmission method of claim 13, wherein after receiving the first reference data groups, the video transmission method further comprises storing the first reference data groups in preset storage locations, wherein a storage space size of a preset storage location is based on maximum delay duration, minimum delay duration, and generation duration of a video data segment in the video data stream, wherein the maximum delay duration is maximum duration required by the video coding device to send a reference data group to the video decoding device through a front-end server, and wherein the minimum delay duration is minimum duration required by the video coding device to send the reference data group to the video decoding device through the front-end server.

18. The video transmission method of claim 17, wherein the storage space size of the preset storage location meets a sixth formula wherein the sixth formula is:

$$Q = \frac{\max(delay) - \min(delay)}{generate\_time} \times s;$$

wherein Q is the storage space size of the preset storage location, wherein max(delay) is the maximum delay duration, wherein min(delay) is the minimum delay duration, wherein generate_time is the generation duration of the video data segment in the video data stream, and wherein s is a data volume size of the video data segment.

19. A video transmission apparatus, used in a video coding device in a live broadcasting network, wherein the live broadcasting network comprises the video coding device, a video decoding device, and a plurality of front-end servers, and wherein the video transmission apparatus comprises:
a non-transitory computer readable medium configured to store computer-executable instructions; and
a processor coupled to the non-transitory computer readable medium and configured to execute the computer-executable instructions to enable the video transmission apparatus to:
obtain a target video data segment, from a video data stream of a to-be-transmitted live video, wherein the target video data segment comprises k data blocks, and wherein k is a positive integer greater than equal to one;
obtain t reference data sets, wherein each of the t reference data sets comprises a piece of reference data, and wherein t is a positive integer greater than k;
encode the target video data segment using each of the t reference data sets to obtain t encoded data blocks that are in a one-to-one correspondence with the t reference data sets, wherein k reference data sets in the t reference data sets and k encoded data blocks that are in a one-to-one correspondence with the k reference data sets form an equation set matrix, and wherein data of a solution matrix of the equation set matrix is data of the target video data segment; and
send t first reference data groups to the video decoding device using n front-end servers, wherein n is a positive integer greater than or equal to one, wherein each of the t first reference data groups comprises one encoded data block and a corresponding reference data set.

20. A video transmission apparatus, used in a video decoding device in a live broadcasting network, wherein the live broadcasting network comprises a video coding device, the video decoding device, and a plurality of front-end servers, and wherein the video transmission apparatus comprises:
a non-transitory computer readable medium configured to store computer-executable instructions;
a processor coupled to the non-transitory computer readable medium and configured to execute the computer-executable instructions to enable the video transmission apparatus to:
receive first reference data groups from u front-end servers, wherein each of the first reference data groups comprises an encoded data block and a corresponding reference data set, wherein the encoded data block is based on encoding a target video data segment in a video data stream of a live video using a corresponding reference data set, wherein the target video data segment comprises k data blocks, wherein the reference data set comprises a piece of reference data, wherein k is a positive integer greater than or equal to one, and wherein u is a positive integer greater than or equal to one;
construct, during a first preset duration, an equation set matrix based on encoded data blocks and reference data sets in k first reference data groups when a quantity of received first reference data groups reaches k; and
determine data of a calculated solution matrix of the equation set matrix as data of the target video data segment.

* * * * *

UNITED STATES PATENT AND TRADEMARK OFFICE
CERTIFICATE OF CORRECTION

PATENT NO. : 11,012,724 B2
APPLICATION NO. : 16/888005
DATED : May 18, 2021
INVENTOR(S) : Zhenyu Li and Jinhui Zhang It is certified that error appears in the above-identified patent and that said Letters Patent is hereby corrected as shown below:

On the Title Page

Item (56) References Cited, U.S. Patent Documents, Line 3: "2013/0047191 A1 2/2013 Gonz Lez-Castano" should read "2013/0047191 A1 2/2013 Gonzalez-Castano"

In the Claims

Claim 1, Column 41, Line 7: "wherein reference data sets" should read "wherein k reference data sets"

Claim 7, Column 42, Line 40: "comprise determining based on" should read "comprise determining, based on"

Claim 15, Column 44, Line 20: "sending, during, the first" should read "sending, during the first"

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*